United States Patent
Irinatsu et al.

(10) Patent No.: US 6,251,220 B1
(45) Date of Patent: Jun. 26, 2001

(54) WASTEPAPER DEINKING METHOD USING AMINE OR ACID SALT OF AMINE IN THE FLOTATION STAGE

(75) Inventors: Yuichi Irinatsu; Yoshitaka Miyauchi; Hiromichi Takahashi, all of Wakayama (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,715

(22) PCT Filed: Apr. 5, 1996

(86) PCT No.: PCT/JP96/00942

§ 371 Date: Aug. 26, 1997

§ 102(e) Date: Aug. 26, 1997

(87) PCT Pub. No.: WO96/31646

PCT Pub. Date: Oct. 10, 1996

(30) Foreign Application Priority Data

Apr. 5, 1995 (JP) .................................................. 7-080403
Apr. 5, 1995 (JP) .................................................. 7-080404
Apr. 5, 1995 (JP) .................................................. 7-080405

(51) Int. Cl.$^7$ .................................................. D21C 5/02
(52) U.S. Cl. ........................................ 162/5; 162/6; 162/8
(58) Field of Search ..................... 162/4, 5, 6, 8

(56) References Cited

U.S. PATENT DOCUMENTS

| 4,043,908 | * | 8/1977 | Roberts et al. | 210/43 |
| 4,162,186 | | 7/1979 | Wood et al. | 162/5 |
| 4,293,097 | * | 10/1981 | Lewis et al. | 241/16 |
| 4,483,741 | | 11/1984 | Maloney et al. | 162/5 |
| 4,605,773 | * | 8/1986 | Maloney et al. | 564/505 |
| 4,935,096 | | 6/1990 | Gallagher et al. | 162/5 |
| 5,227,019 | * | 7/1993 | Borchardt | 162/5 |

FOREIGN PATENT DOCUMENTS

| 0657578A1 | 6/1995 | (EP) . |
| 2125058 | 2/1984 | (GB) . |
| 54-23705 | 2/1979 | (JP) . |
| 59-53532 | 3/1984 | (JP) . |
| 9321376 | 10/1993 | (WO) . |
| 9428237 | 12/1994 | (WO) . |
| 9512026 | 5/1995 | (WO) . |

* cited by examiner

*Primary Examiner*—Dean T. Nguyen
(74) *Attorney, Agent, or Firm*—Birch, Stewart, Kolasch & Birch, LLP

(57) ABSTRACT

A deinking method comprising the steps of liberating ink from waste paper as a raw material and removing the liberated ink from a flotation system, wherein a nonionic surfactant, e.g., a reaction product obtained by adding an alkylene oxide to a mixture of an oil & fat and an alcohol, an alkylene oxide adduct of a fatty acid, or an alkylene oxide adduct of a higher alcohol, is used for the liberation of ink, and the flotation step is effected in the presence of a cationic compound, an amine, an acid salt of an amine or an amphoteric compound at a pH of from 4 to 9, provides a high quality deinked pulp having a high whiteness and a little residual ink spots.

5 Claims, No Drawings

WASTEPAPER DEINKING METHOD USING AMINE OR ACID SALT OF AMINE IN THE FLOTATION STAGE

BACKGROUND OF THE INVENTION

1. Field of the Invention

The present invention relates to a deinking method for deinking waste papers such as news papers, leaflets and magazines to reclaim them. More particularly, it relates to a deinking method excellent in workability by which an excellent deinked pulp having a higher whiteness and a less residual ink spots is obtained at a high yield.

2. Description of the Related Art

Waste papers are reclaimed by liberating ink from the waste papers by a deinking treatment to prepare reclaimed pulp and manufacturing reclaimed paper from the reclaimed pulp. The conventional deinking method generally comprises a step of liberating ink from waste papers and another step of rejecting the liberated ink.

More specially, the deinking method comprises, as main steps, (1) a step of pulping (disintegrating) waste papers,
(2) a step of aging, i.e., leaving the disintegrated paper as it is,
(3) a step of flotation, and
(4) a step of washing.

That is, in deinking treatment, ink bound to the fibers of waste papers is physically and chemically (or biochemically) liberated therefrom to thereby separate the ink from the fibers. Thus, reclaimed pulp is obtained.

In effecting deinking treatment, a deinking agent comprising a surfactant such as a polyoxyethyl alkyl ether and a fatty acid is generally used in any of the above-described steps, for the purposes of liberating ink from waste papers or generating foams to which the liberated ink will adhere.

In recent years, the properties of waste papers which are used as raw materials have been varied because of an increase in a demand for a beautiful and stable printing and a progress in printing techniques. In addition, degrees of binding of ink to paper are varied, including loose ones and tight ones. Under these circumstances, it is demanded to improve the quality and the recovery (i.e., the productivity) of deinked pulp. In order to attain such a purpose, various proposals are offered from various fields including deinking processes, deinking agents and apparatuses used for deinking.

In conventional deinking methods, the pulping step and the flotation step are usually carried out at an alkaline pH of exceeding 9, and in an extremely few cases, at a pH of 9 or less. Deinking methods wherein the pulping step and the flotation step are carried out at a pH of 9 or less are disclosed in Japanese Patent Publication-A Nos. 54-23705 and 59-53532, and U.S. Pat. No. 4,043,908 (published on Aug. 23, 1977; Assignees: Kemanord Aktiebolag and Sala International AB). Specially, Japanese Patent Publication-A No. 54-23705 discloses a method wherein an aluminum salt or white water is added to a waste paper dispersion, the pH of the dispersion is adjusted to a pH ranging from 4 to 7, a polyelectrolyte is added to the dispersion, and then the flotation is effected. Japanese Patent Publication-A No. 59-53532 discloses that a specific alkylamine polyether, which behave as an amine at a basic pH and as an quaternary ammonium at an acidic pH, contributes to the appearances of foam performances required during the pulping step, deinking step of washing-system and flotation step, respectively. U.S. Pat. No. 4,043,908 discloses a method wherein an ethylene oxide adduct of an amine is used for liberating ink from pulp, and the disintegration of waste papers and the liberation of ink therefrom is carried out at a high pH to thereby introduce the ink into micelles, and then the pH of the system is reduced to break the micelles, thereby separating (precipitating) the ink from the pulp, and the ink is removed out of the system by flotation.

According to the method disclosed in Japanese Patent Publication-A No. 54-23705, however, the lathering power is markedly high, and therefore a decrease in the recovery of pulp and an increase in the amount of foams to be rejected (or discharged) during flotation step occur. Such an excess generation of foams is not preferred for flotation and brings about reductions in productivity and quality. The alkylamine polyether disclosed in Japanese Patent Publication-A No. 59-53532 is inferior to conventional polyoxyethylene alkyl ether type deinking agents in the ink-liberating performance and therefore can not provide a pulp having a high whiteness. Further, the ink liberated from pulp with the use of such an alkylamine polyether is in the form of very fine drops and does not have an optimum size suitable for the adsorption to the foam during flotation. Accordingly, the ink can not sufficiently be removed during flotation. The method disclosed in U.S. Pat. No. 4,043,908 does not attain sufficient deinking. The reason is not necessarily clarified. but it is considered to be due to when an ethylene oxide adduct of an amine is used as the deinking agent in the disintegrating step wherein ink is liberated from pulp, the ink is not sufficiently liberated therefrom. and that when the pH of the system is reduced for flotation, the ink which is dispersed in the system or dissolved in the micelles once again adheres to the pulp.

WO 94/28237 teaches a flotation deinking process which comprises the steps of:

1. forming a pulping slurry of printed media and water
2. adding to the slurry (i) a specific non-ionic surfactant of the formula $RO[(AO)_n\text{-}R°]m$; and (ii) a fatty acid or salt thereof of the formula $R^5COOM$ wherein $R^5$ is a linear or branched alkyl (alkenyl) and M is hydrogen or a counterion; and
3. subjecting the slurry to flotation deinking in a flotation cell characterized by:
   (A) using a specific printed media
   (B) adding a water-soluble cationic polymer to the slurry prior to the flotation deinking.

During the pulping step the pH is maintained at about 7.5 to 11. After the slurry exists the pulper it is diluted to about 1 weight % solids. A specific pH reduction step is not taught. WO 93/21376 describes a process of deinking waste paper comprising:

1. forming a pulp from the waste paper in a aqueous medium that has a pH of between 6 and 9 and that is substantially free of dissolved phosphate and includes an ink-dispersing amount of dispersing agent; and
2. separating the ink from the pulp (e.g., by flotation, page 6 line 9).

In this process preferably a surfactant, generally a non-ionic surfactant such as an ethoxylated phenol or fatty alcohol may be used.

DISCLOSURE OF THE INVENTION

SUMMARY OF THE INVENTION

Under the above-mentioned circumstances, the present inventors have made extensive investigations from the viewpoint of the deinking method. As a result of the investigations, the present inventors have found that a deinked pulp having a higher whiteness and a less residual ink spots can be obtained by liberating ink sufficiently from waste papers with the use of a nonionic surfactant as a deinking agent, and effecting the flotation step at a pH of from 4 to 9 in the presence of a cationic compound, an amine, an acid salt of an amine or an amphoteric compound. The present invention has been completed on the basis of this finding.

Thus, the present invention provides a deinking method comprising the steps of liberating ink from. waste paper as a raw material and removing the liberated ink from a flotation system, which comprises adding at least one nonionic surfactant for liberating ink from said waste paper; adjusting the pH of a system to pH 4 to 9 before or during said step for removing the liberated ink from a flotation system; and adding at least one member selected from the group consisting of cationic compounds, amines, acid salts of amines and amphoteric compounds before or during said step for removing the liberated ink from a flotation system.

In other word, the present invention relates to a deinking method comprising at least steps of liberating ink from waste paper as a raw material and removing the liberated ink from a flotation system, wherein at least one nonionic surfactant is used for the liberation of ink; and at least part of the flotation step is effected in the presence of at least one member selected from the group consisting of cationic compounds, amines, acid salts of amines and amphoteric compounds at a pH in a range of from 4 to 9.

The nonionic surfactant is preferably selected from the group consisting of nonionic surfactants (A) to (D):

nonionic surfactant (A): a reaction product obtained by adding an alkylene oxide to a mixture of an oil & fat and an alcohol, nonionic surfactant (B): a compound represented by the formula: $RCOO(AO)_mR'$ (wherein R represents an alkyl or alkenyl group having 7 to 23 carbon atoms; R' represents a hydrogen atom, an alkyl group having 1 to 22 carbon atoms, an alkenyl group having 2 to 22 carbon atoms, or an acyl group having 2 to 22 carbon atoms; AO represents an oxyalkylene group having 2 to 4 carbon atoms; and m is an integer of 1 or more), nonionic surfactant (C): a compound represented by the formula: $RO(AO)_nH$ (wherein R represents an alkyl or alkenyl group having 8 to 24 carbon atoms; AO represents an oxyalkylene group having 2 to 4 carbon atoms; and n is an integer of 1 or more), and nonionic surfactant (D): a reaction product obtained by adding an alkylene oxide to a polyvalent carboxylic acid or an acid anhydride thereof; or a reaction product obtained by adding an alkylene oxide to a mixture of a polyvalent carboxylic acid or an acid anhydride thereof, and alcohol.

The addition form of alkylene oxides in an alkylene oxide adduct among the nonionic surfactants described above may be a block one or a random one, or alternatively a mixture thereof.

At least one member selected from the group consisting of cationic compounds, amines, acid salts of amines and amphoteric compounds is desirably added to the flotation system after adjusting the pH of the system to a value in a range of from pH4 to pH9. In this case, at least one member selected from the group consisting of cationic compounds, amines, acid salts of amines and amphoteric compounds is preferably used in an amount such that the pH of the flotation system is scarcely altered by the addition of such at least one member.

The cationic compounds are desirably selected from the group consisting of compounds represented by the following formulas ($a_1$) to ($e_1$) and cationic polymers represented by the following formulas ($f_1$) to ($j_1$) each of which has a cationic nitrogen content of 0.01 to 35% by weight and a weight-average molecular weight of 2,000 to 3,000,000; the amines and acid salts of amines are desirably selected from the group consisting of compounds represented by the following formulas ($a_2$) to ($h_2$) and polymers represented by the following formulas (i2) to ($l_2$) each of which has an amino-nitrogen content of 0.01 to 35% by weight and a weight-average molecular weight of 2,000 to 3,000,000; and the amphoteric compounds are desirably selected from the group consisting of compounds represented by the following formulas ($a_3$) to ($j_3$), phospholipids ($k_3$), proteins ($l_3$) and amphoteric polymers represented by the following formulas ($m_3$) and ($n_3$) each of which has a cationic nitrogen content of 0.01 to 35% by weight and a weight-average molecular weight of 2,000 to 3,000,000:

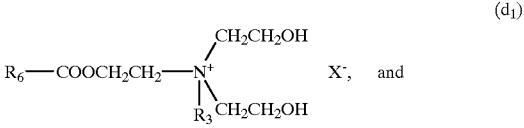

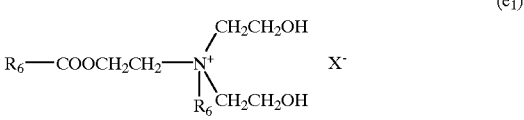

in formulas ($a_1$) to ($e_1$), $R_1$ and $R_2$ may be the same or different from each other and each represents an alkyl, alkenyl or β-hydroxyalkyl group having 10 to 24 carbon atoms; $R_3$, $R_4$ and $R_5$ may be the same or different from one another and each represents an alkyl or hydroxyalkyl group having 1 to 8 carbon atoms, a benzyl group, or a group represented by the formula: $-(AO)_n-Z$ (wherein AO represents an oxyalkylene group having 2 to 4 carbon atoms, z represents a hydrogen atom or an acyl group, and n is an integer of from 1 to 50); $R_6$ represents an alkyl, alkenyl or β-hydroxyalkyl group having 8 to 36 carbon atoms; $X^-$ represents a counter ion; and Y represents an alkyl, alkenyl or β-hydroxyalkyl group having 8 to 36 carbon atoms, a group represented by the formula: $R_6COOCH_2-$ (wherein $R_6$ is as defined above), a group represented by the formula: $R_6CONHCH_2-$ (wherein $R_6$ is as defined above) or a group represented by the formula: $R_6OCH_2-$ (wherein $R_6$ is as defined above);

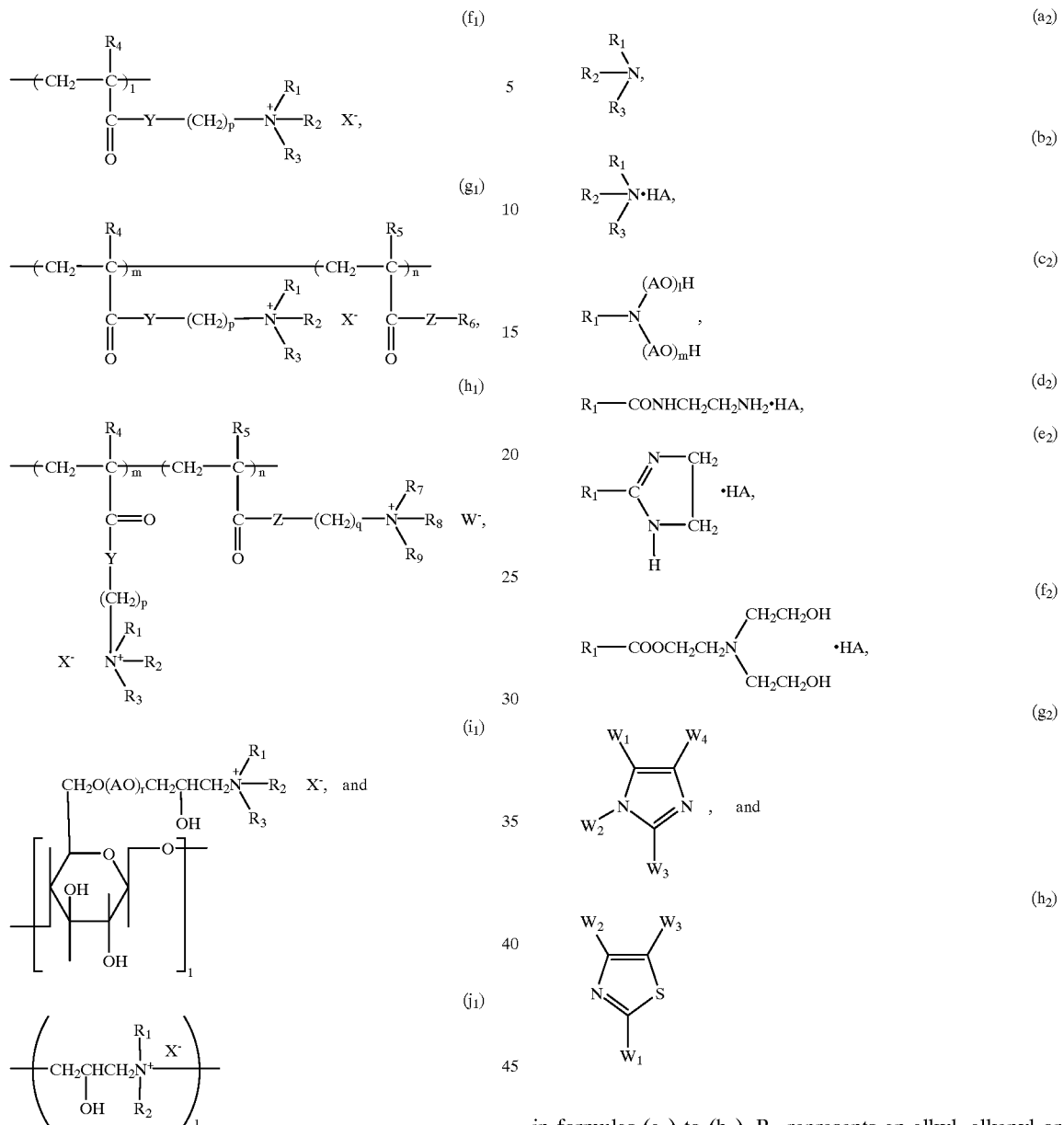

in formulas ($f_1$) to ($j_1$), $R_1$, $R_2$, $R_3$, $R_6$, $R_7$, $R_8$ and $R_9$ may be the same or different from one another and each represents an alkyl group having 1 to 24 carbon atoms or an alkenyl group having 2 to 24 carbon atoms; $R_4$ and $R_5$ may be the same or different from each other and each represents a hydrogen atom or a methyl group; $X^-$ and $W^-$ may be the same or different from each other and each represents a counter ion; Y and Z may be the same or different from each other and each represents O or NH; AO represents an oxyalkylene group having 2 to 4 carbon atoms; p and q may be the same or different from each other and each represents an integer of 1 to 10; r represents an integer of 0 to 10; and 1, m and n are each such a positive number that the weight-average molecular weight of the polymer would be a value in the range of from 2,000 to 3,000,000;

in formulas ($a_2$) to ($h_2$), $R_1$ represents an alkyl, alkenyl or β-hydroxyalkyl group having 8 to 36 carbon atoms; $R_2$ and $R_3$ may be the same or different from each other and each represents a hydrogen atom, an alkyl group having 1 to 24 carbon atoms or an alkenyl group having 2 to 24 carbon atoms; HA represents an inorganic or organic acid; AO represents an oxyalkylene group having 2 to 4 carbon atoms; 1 and m are each zero or a positive integer with the proviso that 1 plus m is an integer of 1 to 300; and $W_1$, $W_2$, $W_3$ and $W_4$ may be the same or different from one another and each represents a hydrogen atom or an alkyl group having 1 to 24 carbon atoms;

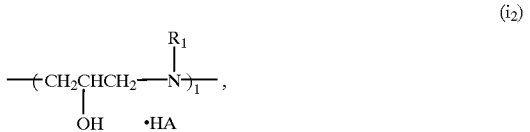

(j2)

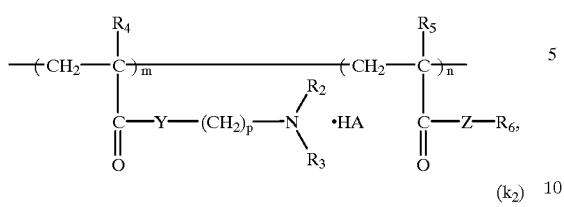

(k2)

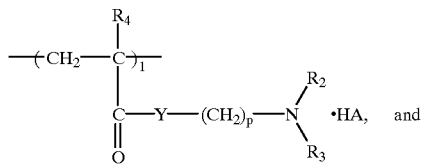

(l2)

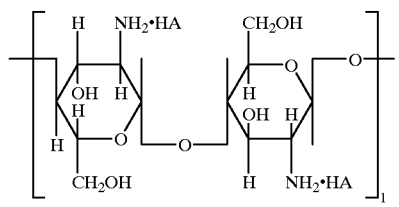

in formulas (i₂) to (l₁₂), $R_1$ represents an alkyl group having 1 to 24 carbon atoms or an alkenyl group having 2 to 24 carbon atoms; $R_2$, $R_3$ and $R_6$ may be the same or different from one another and each represents a hydrogen atom, an alkyl group having 1 to 24 carbon atoms or an alkenyl group having 2 to 24 carbon atoms; $R_4$ and $R_5$ may be the same or different from each other and each represents a hydrogen atom or a methyl group; HA represents an inorganic or organic acid; Y represents O or NH; p represents an integer of 1 to 10; and l, m and n are each such a positive number that the weight-average molecular weight of the polymer would be a value in the range of from 2,000 to 3,000,000;

(a₃)

R₂—N→O,
 |  \
 R₁  R₃

(b₃)

R₂—N⁺—CH₂COO⁻,
 |  \
 R₁  R₃

(c₃)

Y₁\
  N—CH₂COOM,
Y₂/

(d₃)

R₄—CONHCH₂CH₂N(CH₂COOM)(CH₂COOM), (e₃)

R₄—N⁺(CH₂COOM)(CH₂COOM)(CH₂COOM), (f₃)

R₄—N(Z₁)(Z₂), (g₃)

R₄—NHCH₂CH₂COOM, (h₃)

R₄—NH(CH₂)₅COOM, (i₃)

R₂—N⁺(R₁)(R₃CHCOO⁻)
         |
         CH₂COOH and (j₃)

R₄—C=N—CH₂
     |      \
     N⁺      CH₂
    / \
 CH₂COO⁻ CH₂CH₂OH in formulas (a₃) to (j₃), $R_1$, $R_2$ and $R_3$ may be the same or different from one another and each represents an alkyl group having 1 to 24 carbon atoms or an alkenyl group having 2 to 24 carbon atoms; $R_4$ represents an alkyl, alkenyl or β-hydroxyalkyl group having 8 to 36 carbon atoms; M represents a hydrogen atom, an alkali metal atom, ½ mole of an alkaline earth metal atom or an ammonium group; $Y_1$ represents a group represented by the formula: $R_5NHCH_2CH_2-$ (wherein $R_5$ represents an alkyl group having 1 to 36 carbon atoms or an alkenyl or β-hydroxyalkyl group having 2 to 36 carbon atoms); $Y_2$ represents a hydrogen atom or a group represented by the formula: $R_5NHCH_2CH_2-$ (wherein $R_5$ is as defined above); $Z_1$ represents a group represented by the formula: —CH₂COOM (wherein M is as defined above); and $Z_2$ represents a hydrogen atom or a group represented by the formula: —CH₂COOM (wherein M is as defined above); and (m₃)

—(CH₂—C(R₄))ₘ—(CH₂—C(R₅))ₙ—, and
        |              |
        C=O           COOM
        |
        Y
        |
       (CH₂)ₚ
        |
   X⁻  N⁺—R₂
        |\
        R₁ R₃

(n3)

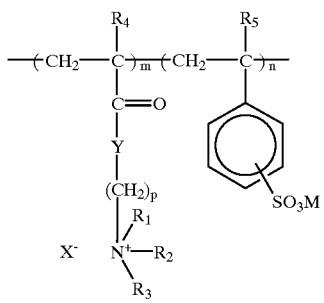

in formulas (m₃) and (n₃), $R_1$, $R_2$ and $R_3$ may be the same or different from one another and each represents a hydrogen atom, an alkyl group having 1 to 24 carbon atoms or an alkenyl group having 2 to 24 carbon atoms; $R_4$ and $R_5$ may be the same or different from each other and each represents a hydrogen atom or a methyl group; M represents a hydrogen atom, an alkali metal atom, ½ mole of an alkaline earth metal atom or an ammonium group; $X^-$ represents a counter ion; Y represents O or NH; p is an integer of 1 to 10; and m and n are each such a positive number that the weight-average molecular weight of the polymer would be a value in the range of from 2,000 to 3,000,000.

The present invention includes a deinking method comprising at least a step of liberating ink from waste paper as a raw material and a step of removing the liberated ink therefrom by flotation, characterized in that one or two or more deinking agent(s) selected from among the above nonionic surfactants (A) to (D) is(are) used; the pH in the system during flotation is controlled to 4 to 9; and a cationic compound(s) is(are) allowed to be present in the system during flotation. In this case, the cationic compound(s) is(are) preferably one or more compounds selected from the group consisting of those represented by the above formulas ($a_1$) to ($e_1$).

The present invention also includes a deinking method comprising at least a step of liberating ink from waste paper as a raw material and a step of removing the liberated ink therefrom by flotation, characterized in that one or two or more deinking agent(s) selected from among the above nonionic surfactants (A) to (D) is(are) used; the pH in the system during flotation is controlled to 4 to 9; and an amine(s) or an acid salt(s) of an amine(s) is(are) allowed to be present in the system during flotation. In this case, the amine(s) or the acid salt(s) of the amine(s) is(are) preferably one or more compounds selected from the group consisting of those represented by the following formulas ($a_2$) to ($h_2$):

(a₂)

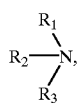

(b₂)

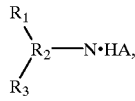

(c₂)

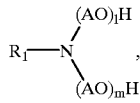

(d₂)

$R_1$—CONHCH₂CH₂NH₂·HA, (e₂)

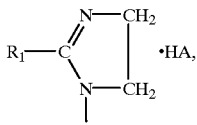

(f₂)

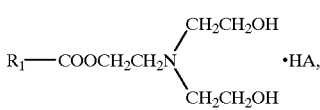

(g₂)

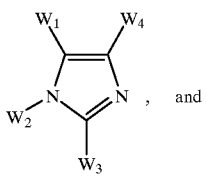
, and (h₂)

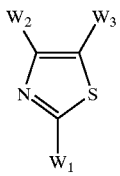

wherein $R_1$ represents an alkyl, alkenyl or β-hydroxyalkyl group having 8 to 36 carbon atoms; $R_2$ and $R_3$ may be the same or different from each other and each represents a hydrogen atom or an alkyl group having 1 to 24 carbon atoms; HA represents an inorganic or organic acid; AO represents an oxyalkylene group having 2 to 4 carbon atoms; l and m are each such an integer that l plus m would be a numerical value of above zero and 300 or below; and $W_1$, $W_2$, $W_3$ and $W_4$ may be the same or different from one another and each represents a hydrogen atom or an alkyl group having 1 to 24 carbon atoms.

The present invention includes, further, a deinking method comprising at least a step of liberating ink from waste paper as a raw material and a step of removing the liberated ink therefrom by flotation, characterized in that one or two or more deinking agent(s) selected from among the above nonionic surfactants (A) to (D) is(are) used; the pH in the system during flotation is controlled to 4 to 9; and an amphoteric compounds) is(are) allowed to be present in the system during flotation. In this case, the amphoteric compound(s is(are) preferably one or more compounds selected from the group consisting of those represented by the following formulas ($a_3$) to ($j_3$), phospholipids ($k_3$) and proteins ($l_3$):

(a₃)

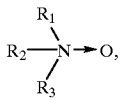

(b₃)

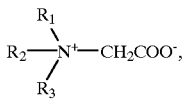

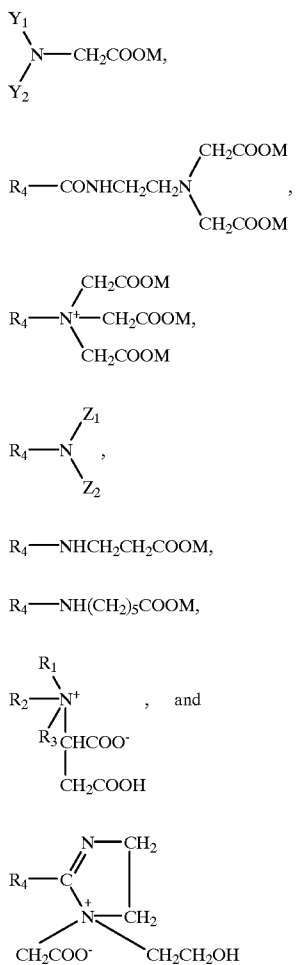

wherein $R_1$, $R_2$ and $R_3$ may be the same or different from one another and each represents an alkyl group having 1 to 24 carbon atoms; $R_4$ represents an alkyl, alkenyl or β-hydroxyalkyl group having 8 to 36 carbon atoms; M represents a hydrogen atom, an alkali metal atom, ½ mole of an alkaline earth metal atom or an ammonium group; $Y_1$ represents a group represented by the formula: $R_5NHCH_2CH_2$— (wherein $R_5$ represents an alkyl, alkenyl or β-hydroxyalkyl group having 8 to 36 carbon atoms); $Y_2$ represents a hydrogen atom or a group represented by the formula: $R_5NHCH_2CH_2$— (wherein $R_5$ is as defined above); $Z_1$ represents a group represented by the formula: —$CH_2COOM$ (wherein M is as defined above); and $Z_2$ represents a hydrogen atom or a group represented by the formula: —$CH_2COOM$ (wherein M is as defined above).

As described above, increase of lathering during flotation is observed in deinking treatment according to the method disclosed in Japanese Patent Publication-A 54-23705. As a result of investigations made by the present inventors, it is confirmed that the above phenomenon is caused by using a nonionic or anionic polyelectrolyte such as polyacrylamide (PAM) under such a condition that the aluminum ion concentration of the system is high in flotation. In contrast, the deinking method of the present invention, wherein a nonionic surfactant is employed as a deinking agent, and the flotation is effected at a pH of from 4 to 9 in the presence of a cationic compound, an amine, an acid salt of an amine or an amphoteric compound, provides such a marked effect that deinked pulp having a high quality can be obtained at a high recovery. It is considered that the above effect can be attained by the present invention because ink is sufficiently liberated from fibers of waste paper by the use of a nonionic surfactant, and the liberated ink is efficiently collected for the removal thereof because of the presence of a cationic compound, an amine, an acid salt of an amine or an amphoteric compound at a pH falling within a range of from 4 to 9 in flotation.

Further scope and applicability of the present invention will become apparent from the detailed description and examples given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description and these examples.

DETAILED DESCRIPTION OF THE INVENTION

The deinking method of the present invention comprises at least steps of liberating ink from waste paper and removing the liberated ink from a flotation system.

Next, the nonionic surfactants to be used as deinking agents in the present invention will now be illustrated.

Nonionic surfactant (A) A reaction product obtained by adding an alkylene oxide to a mixture of an oil & fat and an alcohol.

Nonionic surfactant (A) is an alkylene oxide adduct of a mixture of an oil & fat and a mono- or polyhydric alcohol. The alkylene oxide is added to the mixture described above in an amount, on the average, of 5 to 300 moles, preferably 20 to 150 moles, per mole of the mixture. Examples of the alkylene oxides include ethylene oxide, propylene oxide and butylene oxide, and they may be used singly or in the form of a mixture of two or more of them.

The mixing ratio of the oil & fat to the alcohol is preferably 1/0.1 to 1/6, particularly preferably 1/0.3 to 1/3 by mole. When this ratio falls with in the range described above, a reclaimed pulp having an excellent appearance can be obtained since the liberation of ink is efficiently attained.

Examples of the oils & fats as a raw material of nonionic surfactant (A) include vegetable oils such as coconut oil, palm oil, olive oil, soybean oil, rape seed oil and linseed oil, animal oils such as lard, beef tallow and bone oil, and fish oils; hardened oils thereof and semi-hardened oils thereof; and recovered oils obtained in refining processes of these oils & fats.

Examples of the monohydric alcohols as a raw material of nonionic surfactant (A) include those having an alkyl or alkenyl moiety of 8 to 24 carbon atoms and those having an alkylphenyl moiety wherein the alkyl moiety has 6 to 14 carbon atoms. Specific examples thereof include 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docosanol, 1-tricosanol, 1-tetracosanol, 2-octanol, 2-nonanol, 2-decanol, 2-undecanol, 2-dodecanol, 2-tridecanol, 2-tetradecanol, 2-pentadecanol, 2-hexadecanol, 2-heptadecanol, 2-octadecanol, 2-nonadecanol, 2-eicosanol, 2-octen-1-ol, 2-dodecen-1-ol, 2-undecen-1-ol, 2-tetradecen-1-ol, 2-pentadecen-1-ol, 2-hexadecen-1-ol, 2-octadecen-1-ol, 8-nonen-1-ol, 10-undecen-1-ol, 11-dodecen-1-ol, 12-tridecen-1-ol, 15-hexadecen-1-ol, oleyl alcohol, elaidyl alcohol, linoleyl alcohol, linolenyl alcohol, eleostearyl alcohol, ricinoyl alcohol, cyclononanol, cyclodecanol, cycloundecanol, cyclododecanol, cyclotridecanol, cyclotetradecanol, cyclopentadecanol, cyclohexadecanol, cycloheptadecanol, cyclooctadecanol, cyclononadecanol, cycloeicosanol, octylphenol and nonylphenol.

Examples of the polyhydric alcohols as a raw material of nonionic surfactant (A) include ethylene glycol, propylene glycol, trimethylene glycol, butylene glycol, 1,6-hexanglycol, 2-ethylbutane-1,2,3-triol, glycerol, trimethylolpropane, trimethylolethane, 1,2,4-butanetriol, 1,2,6-hexanetriol, 1,1,1-trimethylolhexane, tetramethylolcyclohexanols, diglycerol, mannitane, pentaerythritol, erythritol, arabitol, sorbitol, D-glycero-D-galactoheptose, D-glycero-D-glucoheptose, D-glycero-D-mannoheptose, D-glycero-L-mannoheptose, D-altroheptulose, D-mannoheptulose, D-altro-3-heptulose, D-glycero-D-galaheptitol, D-erythro-D-galaoctitol, D-glycero-D-mannooctulose, D-erythlo-L-glononulose, celloblose, maltose, lactose, gentianose, cellotriose and stachyose.

Nonionic Surfactant (B): A compound represented by the formula: $RCOO(AO)_m R'$ (wherein R represents an alkyl or alkenyl group having 7 to 23 carbon atoms; R' represents a hydrogen atom, an alkyl group having 1 to 22 carbon atoms, an alkenyl group having 2 to 22 carbon atoms, or an acyl group having 2 to 22 carbon atoms; AO represents an oxyalkylene group having 2 to 4 carbon atoms; and m is an integer of 1 or more).

When the carbon atom number of the alkyl or alkenyl group in the definition of R is 7 to 23, nonionic surfactant (B) exhibits an excellent ink-collecting ability and an excellent ink-liberating ability to thereby provide reclaimed pulp having a high whiteness and an excellent appearance.

When the carbon atom number of the alkyl, alkenyl or acyl group in the definition of R' is 22 or less, or R' represents a hydrogen atom, nonionic surfactant (B) exhibits an excellent ability for liberating ink from cellulose to thereby provide reclaimed pulp having an excellent appearance, and exhibits an appropriate lathering power to thereby attain an excellent workability.

Nonionic surfactant (B) is produced by adding an alkylene oxide to a fatty acid by a conventional method, optionally followed by esterification or acylation. The alkylene oxide is added to a fatty acid in an amount, on the average, of 5 to 300 moles, preferably 10 to 150 moles, per mole of the fatty acid. That is, nonionic surfactant (B) is generally a reaction product mixture comprising compounds each represented by the above formula: $RCOO(AO)_m R'$. Examples of the alkylene oxides include those described in the above explanation relating to nonionic surfactant (A). It is preferred to use ethylene oxide and propylene oxide in a molar ratio of ethylene oxide to propylene oxide of 1/5 to 5/1 in the production of nonionic surfactant (B).

Examples of the fatty acids to be used for producing nonionic surfactant (B) include those having an alkyl or alkenyl moiety, corresponding to R, of 7 to 23 carbon atoms, and specific examples thereof include caprylic acid, pelargonic acid, capric acid, undecanoic acid, lauric acid, tridecanoic acid, myristic acid, pentadecanoic acid, palmitic acid, margaric acid, stearic acid, oleic acid, elaidic acid, linoleic acid, linolenic acid, stearolic acid, ricinolic acid, ricinoelaidic acid, nonadecanoic acid, arachidic acid, heneicosanoic acid, behenic acid, brassidic acid, erucic acid, tricosanoic acid, tetracosanoic acid, coconut oil fatty acid, beef tallow fatty acid, palm oil fatty acid, tall oil fatty acid, rape oil fatty acid and fish oil fatty acid. Among nonionic surfactants (B), those having an alkyl or alkenyl group represented by R of 11 to 23 carbon atoms are preferred.

Nonionic surfactant (C): A compound represented by the formula: $RO(AO)_n H$ (wherein R represents an alkyl or alkenyl group having 8 to 24 carbon atoms; AO represents an oxyalkylene group having 2 to 4 carbon atoms; and n is an integer of 1 or more).

When the carbon atom number of the alkyl or alkenyl group in the definition of R is 8 to 24, nonionic surfactant (C) exhibits an excellent ability for liberating ink from cellulose to thereby provide reclaimed pulp having a high whiteness and an excellent appearance.

Nonionic surfactant (C) is produced by adding an alkylene oxide to a monohydric alcohol by a conventional method. The alkylene oxide is added to a monohydric alcohol in an amount, on the average, of 5 to 300 moles, preferably 7 to 150 moles, per mole of the monohydric alcohol. That is, nonionic surfactant (C) is generally a reaction product mixture comprising compounds each represented by the above formula: $RO(AO)_n H$. Examples of the alkylene oxides include those described in the above explanation relating to nonionic surfactant (A). It is preferred to use ethylene oxide and propylene oxide in a molar ratio of ethylene oxide to propylene oxide of 1/5 to 5/1 in the production of nonionic surfactant (C).

Examples of the monohydric alcohols to be used for producing nonionic surfactant (C) include those having an alkyl or alkenyl moiety of 8 to 24 carbon atoms and those having an alkylphenyl moiety wherein the alkyl moiety has 6 to 14 carbon atoms, and specific examples thereof include those described in the above explanation relating to nonionic surfactant (A). Among nonionic surfactants (C), those having an alkyl or alkenyl group represented by R of 14 to 24 carbon atoms are preferred.

Nonionic surfactant (D): A reaction product obtained by adding an alkylene oxide to a polyvalent carboxylic acid or an acid anhydride thereof; or a reaction product obtained by adding an alkylene oxide to a mixture of a polyvalent carboxylic acid or an acid anhydride thereof, and alcohol.

Examples of the polyvalent (or polybasic) carboxylic acids and acid anhydride thereof as a raw material of nonionic surfactant (D) include oxalic acid, malonic acid, succinic acid, methylsuccinic acid, maleic acid, glutaric acid, adipic acid, phthalic acid, fumaric acid, itaconic acid, malic acid, tartaric acid, maleated oleic acid, citric acid, percitric acid, trimellitic acid, butanetetracarboxylic acid, pyromellitic acid, tetradecanehexacarboxylic acid, maleic anhydride, succinic anhydride, oxalic anhydride, itaconic anhydride, glutaric anhydride, phthalic anhydride, trimellitic anhydride, pyromellitic anhydride and stearylsuccinic anhydride.

Further, dimer acids and polymer acids of higher fatty acids having 14 to 22 carbon atoms are included in the scope of the polyvalent carboxylic acid. Dimer acids and polymer acids herein can be synthesized by a method wherein a monoolefinic carboxylic acid or a diolefinic carboxylic acid, such as an unsaturated fatty acid monomer, e.g., oleic acid, linoleic acid or linolenic acid, is subjected to thermal polymerization such as a Diels-Alder reaction, or another method. The polymer acid herein is a polycarboxylic acid having three or more carboxyl groups in a molecule and does not includes a dimer acid. The dimer acid or polymer acid used herein may be a mixture thereof with an unreacted monomer acid. That is, it is not concerned that an unreacted monomer acid is present as far as the effects of the present invention are not failed.

Examples of the alcohols as a raw material of nonionic surfactant (D) include monohydric alcohols and polyhydric alcohols, and specific examples thereof include those described in the above explanation relating to nonionic surfactant (A).

In the production of nonionic surfactant (D) with a polyvalent carboxylic acid or an acid anhydride thereof (I) and an alcohol (II), the compounds (I) and (II) are preferably used in a molar ratio of (I) to (II) of 1/0.02 to 5/1, particularly 1/0.1 to 3/1. When the molar ratio falls within this range, the above-mentioned nonionic surfactant (D) can efficiently collect fine ink drops and the collected ink drops are effectively removed out from the system in flotation. Therefore, a reclaimed pulp having a high whiteness is provided.

The nonionic surfactant may be added in any step of the deinking process. However, it is usually added in a pulping step. The addition amount thereof is not specifically restricted. A sufficient ink-liberating effect is not achieved with only a deinking agent other than these nonionic surfactants of the present invention. A known deinking agent other than nonionic surfactants (A) to (D) described above may be used in combination therewith.

The flotation method as one of deinking methods is characterized in that a pulp/water slurry is lathered by a suitable means such as a physical means and a chemical means, ink drops adhere to floated foams and the resulting foams with ink drops are rejected to thereby separate ink from pulp. In the deinking method of the present invention, at least part of the flotation step is effected at a pH in a range of from 4 to 9, preferably from 6 to 8. Therefore, the pH of the pulp/water slurry may be adjusted at a pH in a range of from pH4 to pH9 in any step before flotation.

The steps prior to flotaion are effected generally at a basic pH. Therefore, in the present invention, a suitable acid or an aqueous solution thereof is added to the pulp/water slurry before or during flotation to adjust the pH of the slurry to a value in the above-mentioned range. An acid or an aqueous solution thereof may be added to the water which is poured into the slurry before or during flotation, though the addition method of the acid is not specifically restricted. Examples of the acids to be used for adjusting the pH of the slurry include inorganic acids such as hydrochloric acid, sulfuric acid and nitric acid, salts thereof, and organic acids such as acetic acid, formic acid and citric acid. The method for adjusting the pH of the slurry is not restricted to those using acids. When the pH of the slurry in at least part of the flotation step is a value within the range described above, an increase in whiteness of the reclaimed pulp, a reduction of residual ink spots in the reclaimed paper and an increase in the recovery are attained. Further, apparatuses and pulp fibers per se are affected by the properties of the slurry.

The deinking method of the present invention is also characterized in that a cationic compound, an amine, an acid salt of an amine or an amphoteric conpound is to be present in the system in flotation.

The cationic compound herein is cationic or has a cationic group at pH 4 to 9 in flotation. Examples of the cationic compounds include mono(long-chain)alkyl-type quaternary ammonium salts, di(long-chain)alkyl-type quaternary ammonium salts, pyridinium salts having a substituent at the nitrogen atom thereof, and cationic polymers. In particular, the compounds represented by the above formulas ($a_1$) to ($e_1$) and cationic polymers represented by the above formulas ($f_1$) to ($j_1$) each of which has a cationic nitrogen content of 0.01 to 35% by weight and a weight-average molecular weight of 2,000 to 3,000,000 are preferred.

In the respective formulas ($a_1$) to ($e_1$), examples of the groups in the definitions of $R_1$ and $R_2$ include lauryl group, myristyl group, cetyl group, stearyl group, behenyl group, oleyl group and linoleyl group. $R_1$ and $R_2$ may be the same or different from each other. Examples of the alkyl groups each having 1 to 8 carbon atoms in the definitions of $R_3$, $R_4$ and $R_5$ include methyl group, ethyl group, propyl group, butyl group, hexyl group, octyl group, isopropyl group and isobutyl group. $R_3$, $R_4$ and $R_5$ may be the same or different from one another. Examples of the acyl groups in the definition of Z include those derived from fatty acids each having 2 to 24 carbon atoms, e.g., formyl group, acetyl group, propionyl group, butyryl group, lauroyl group, myristoyl group, palmitoyl group, stearoyl group, isobutyryl group, oleoyl group and methacryl group. Examples of the groups in the definition of $R_6$ include octyl group, lauryl group, myristyl group, cetyl group, stearyl group, behenyl group, hexacosyl group, hexatriacontyl group, oleyl group and linolenyl group. $X^-$ is a counter ion and examples thereof include a hydroxyl ion, halide ions, monoalkylsulfate ions wherein the alkyl portion has 1 to 3 carbon atoms, and anions derived from inorganic and organic acids. Specially, $X^-$ represents a halide ion such as a chloride ion, a bromide ion and a fluoride ion, a monoalkylsulfate ion such as a methylsulfate ion and an ethylsulfate ion, a counter ion derived from an inorganic acid such as sulfuric acid, nitric acid, carbonic acid and phosphoric acid, or another counter ion derived from a mono- or polyvalent organic acid such as acetic acid and citric acid.

The cationic polymers represented by the above formulas ($f_1$) to ($j_1$) each has a weight-average molecular weight of 2,000 to 3,000,000, preferably 10,000 to 1,000,000 and contains 0.01 to 35% by weight, preferably 0.01 to 10% by weight, still more preferably 0.1 to 5% by weight, of cationic nitrogen atoms. The cationic nitrogen content is determined, for example, by determining the nitrogen content (%) of the polymer by Kjeldahl method and multiplying the nitrogen content (%) determined by the ratio of the cationic nitrogen to the total nitrogen which is calculated from the molucular formula of the polymer.

Examples of the above-mentioned cationic polymers include polymers comprising acrylamide and modified with a group having a quaternary ammoniun group, such as acrylamide polymers modified with a group having a quaternary ammoniun group and copolymers of acrylamide with an acrylate modified with a group having a quaternary ammoniun group; polymers comprising an acrylate and modified with a group having a quaternary ammoniun group, such as acrylate polymers modified with a group having a quaternary ammoniun group and copolymers of an acrylate with the other acrylate modified with a group having a quaternary ammoniun group; stylene polymers modified with a group having a quaternary ammoniun group; diallylamine polymers modified with a group having a quaternary ammoniun group; cationized cellulose; and cationed chitosan.

In the respective formulas ($f_1$) to ($j_1$), examples of the groups in the definitions of $R_1$, $R_2$, $R_3$, $R_6$, $R_7$, $R_8$ and $R_9$ include methyl group, ethyl group, propyl group, butyl group, hexyl group, octyl group, lauryl group, myristyl group, cetyl group, stearyl group, behenyl group, oleyl group, linoleyl group, isopropyl group and isobutyl group. $X^-$ and $W^-$ in the above formulas ($f_1$) to ($j_1$) are each a counter ion and examples thereof include those described in the above explanation relating to $X^-$ in formulas ($a_1$) to ($e_1$). Further, the AO in the above formulas ($f_1$) to ($j_1$) refers to an oxyalkylene group having 2 to 4 carbon atoms, and examples thereof include oxyethylene group, oxypropylene group and oxybutylene group.

The amine or the acid salt of the amine herein has a nitrogen atom which may be cationized at pH 4 to 9 in flotation. Examples of the amines and the acid salts of amines include primary amines, secondary amines, tertiary amines, cyclic amines, imidazoles and imidazolines; inorganic acid salts of these amines; organic acid salts of these amines; and polymers having an amino group. In particular, the compounds represented by the above formulas ($a_2$) to ($h_2$) and polymers represented by the above formulas ($i_2$) to ($l_2$) each of which has an amino-nitrogen content of 0.01 to 35% by weight and a weight-average molecular weight of 2,000 to 3,000,000 are preferred.

In the respective formulas ($a_2$) to ($h_2$), examples of the groups in the definition of $R_1$ include those described in the above explanation relating to $R_6$ in formulas ($a_1$) to ($e_1$). Examples of the groups in the definitions of $R_2$ and $R_3$ include those described in the above explanation relating to $R_1$, $R_2$, $R_3$, $R_6$, $R_7$, $R_8$ and $R_9$ in formulas ($f_1$) to ($j_1$). $R_2$ and $R_3$ may be the same or different from each other. HA represents an inorganic acid, e.g., hydrochloric acid, sulfuric acid, nitric acid, carbonic acid, phosphoric acid or hydrobromic acid; or a mono- or polyvalent organic acid, e.g., formic acid, acetic acid, propionic acid, butyric acid, lauric acid, stearic acid, malonic acid, succinic acid, acrylic acid, maleic acid, fumaric acid or citric acid. l and m are each zero or a positive integer with the proviso that l plus m is an integer of 1 to 300. Examples of the alkyl groups in the definitions of $W_1$, $W_2$, $W_3$ and $W_4$ include methyl group, ethyl group, propyl group, butyl group, hexyl group, octyl group, lauryl group, myristyl group, cetyl group, stearyl group, behenyl group, isopropyl group and isobutyl group. $W_1$, $W_2$, $W_3$ and $W_4$ may be the same or different from one another.

Among amines and acid salts of amines represented by the above formulas ($a_2$) to ($h_2$), preferred are those represented by the formulas ($a_2$) to ($h_2$) wherein $R_1$ represents an alkyl, alkenyl or β-hydroxyalkyl group having 8 to 36 carbon atoms; $R_2$ and $R_3$ may be the same or different from each other and each represents a hydrogen atom or an alkyl group having 1 to 24 carbon atoms; HA represents an inorganic or organic acid; AO represents an oxyalkylene group having 2 to 4 carbon atoms; l and m are each such an integer that l plus m would be a numerical value of above zero and 300 or below; and $W_1$, $W_2$, $W_3$ and $W_4$ may be the same or different from one another and each represents a hydrogen atom or an alkyl group having 1 to 24 carbon atoms.

The polymers represented by the above formulas ($i_2$) to ($l_2$) each has a weight-average molecular weight of 2,000 to 3,000,000, preferably 10,000 to 1,000,000 and contains 0.01 to 35% by weight, preferably 0.01 to 10% by weight, still more preferably 0.1 to 5% by weight, of amino-nitrogen atoms. The amino-nitrogen content is determined, for example, by determining the nitrogen content (%) of the polymer by KJeldahl method and multiplying the nitrogen content (%) determined by the ratio of the amino-nitrogen to the total nitrogen which is calculated from the molucular formula of the polymer.

Examples of the above-mentioned polymers include linear polyamines such as polyvinylamine and polyethyleneimine; polymers of cyclic amines such as polyvinylpyridine, polyaminostyrene and polyvinylimidazole; formaldehyde condensates such as melamine/formaldehyde condensate and urea/formaldehyde condensate; polymers comprising acrylamide and modified with a group having an amino group, such as acrylamide polymers modified with a group having an amino group and copolymers of acrylamide with an acrylate modified with a group having an amino group; polymers comprising an acrylate and modified with a group having an amino group, such as acrylate polymers modified with a group having an amino group and copolymers of an acrylate with the other acrylate modified with a group having an amino group; and polymeric amine compounds such as chitosan; and acid salts of these polymers.

In the respective formulas (i2) to ($l_2$), examples of the alkyl groups and alkenyl groups in the definitions of $R_1$, $R_2$, $R_3$ and $R_6$ include methyl group, ethyl group, propyl group, butyl group, hexyl group, octyl group, lauryl group, myristyl group, cetyl group, stearyl group, behenyl group, oleyl group, linoleyl group, isopropyl group and isobutyl group. HA represents an inorganic or oragnic acid, and examples thereof include those described in the above explanation relating to HA in formulas ($a_2$) to ($h_2$).

The amphoteric compound herein has a cationic group at pH 4 to 9 in flotation. Examples of the amphoteric compounds include betaines, amine oxides, phospholipids, proteins and amphoteric polymers. In particular, the compounds represented by the above formulas ($a_3$) to ($j_3$), phospholipids ($k_3$), proteins ($l_3$) and amphoteric polymers represented by the above formulas ($m_3$) and ($n_3$) each of which has a cationic nitrogen content of 0.01 to 35% by weight and a weight-average molecular weight of 2,000 to 3,000,000 are preferred. Further, proteins ($l_3$) each having a weight-average molecular weight of 2,000 to 3,000,000, desirably 10,000 to 1,000,000 and containing 0.01 to 35% by weight, desirably 0.01 to 10% by weight, still more desirably 0.1 to 5% by weight, of cationic nitrogen atoms, are still more preferred.

In the respective formulas ($a_3$) to ($j_3$), examples of the alkyl groups and alkenyl groups in the definitions of $R_1$, $R_2$ and $R_3$ include those described in the above explanation relating to $R_1$, $R_2$, $R_3$ and $R_6$ in formulas ($i_2$) to ($l_2$). Examples of the groups in the definitions of $R_4$ include those described in the above explanation relating to $R_6$ in formulas ($a_1$) to ($e_1$). Examples of the groups in the definitions of $R_5$ include methyl group, ethyl group, propyl group, butyl group, hexyl group, octyl group, isopropyl group, isobutyl group, lauryl group, myristyl group, cetyl group, stearyl group, behenyl group, hexacosyl group, hexatriacontyl group, oleyl group and linoleyl group.

Examples of the phospholipids ($k_3$) include phosphatidyl choline, phosphatidyl ethanolamine, sphingomyelin, phosphatidyl serine and lysolecithine. Further, examples of the proteins ($l_3$) include natural proteins derived from natural materials, e.g., soybean protein or lactoprotein, those prepared by the partial hydrolysis of the natural proteins, and denatured products of the natural proteins. The molecular weight, kind of the atoms constituting the protein, the degree of the denaturation or the like is not restricted.

Among amphoteric compounds represented by the above formulas ($a_3$) to ($j_3$), phospholipids ($k_3$) and proteins ($l_3$), preferred are phospholipids. ($k_3$), proteins ($l_3$) and those represented by the formulas ($a_3$) to ($j_3$) wherein $R_1$, $R_2$ and $R_3$ may be the same or different from one another and each represents an alkyl group having 1 to 24 carbon atoms; $R_4$ represents an alkyl, alkenyl or β-hydroxyalkyl group having 8 to 36 carbon atoms; M represents a hydrogen atom, an alkali metal atom, ½ mole of an alkaline earth metal atom or an ammonium group; $Y_1$ represents a group represented by the formula: $R_5NHCH_2CH_2$— (wherein $R_5$ represents an alkyl, alkenyl or β-hydroxyalkyl group having 8 to 36 carbon atoms); $Y_2$ represents a hydrogen atom or a group represented by the formula: $R_5NHCH_2CH_2$— (wherein $R_5$ is as defined above); $Z_1$ represents a group represented by the formula: —$CH_2COOM$ (wherein M is as defined above); and $Z_2$ represents a hydrogen atom or a group represented by the formula: —$CH_2COOM$ (wherein M is as defined above).

The amphoteric polymers other than proteins, and represented by the above formulas ($m_3$) and ($n_3$) each has a weight-average molecular weight of 2,000 to 3,000,000, preferably 10,000 to 1,000,000 and contains 0.01 to 35% by weight, preferably 0.01 to 10% by weight, still more preferably 0.1 to 5% by weight, of cationic nitrogen atoms. The cationic nitrogen content is determined, for example, by determining the nitrogen content (%) of the polymer by Kjeldahl method and multiplying the nitrogen content (%) determined by the ratio of the cationic nitrogen to the total nitrogen which is calculated from the molucular formula of the polymer.

Examples of the above-mentioned amphoteric polymers include polyvinylbetaines, copolymers of acrylic acid with acrylamide partially modified by Mannich reaction, and copolymers of an dialkylaminoalkyl acrylate with a sulfonated stylene.

In the respective formulas (m₃) and (n₃), examples of the alkyl groups and alkenyl groups in the definitions of $R_1$, $R_2$ and $R_3$ include those described in the above explanation relating to $R_1$, $R_2$, $R_3$, $R_6$, $R_7$, $R_8$ and $R_9$ in formulas (f₁) to (j₁). $R_1$, $R_2$ and $R_3$ may be the same or different from one another.

At least one member selected from the group consisting of cationic compounds, amines, acid salts of amines and amphoteric compounds is used in an amount of 0.001 to 5.0% by weight, preferably 0.01 to 1.0% by weight, based on the weight of waste paper (i.e., the absoluted dry weight of waste paper) in flotaion. When the above-mentioned at least one member selected is present in the system, i.e., in the slurry, in flotation in such an amount as described above, ink can be selectively removed from the system.

In the present invention, it is necessary that a pulp/water slurry in at least one step of flotation contains the cationic compound, amine, acid salt of amine or amphoteric compound. Therefore, the cationic compound, amine, acid salt of amine or amphoteric compound may be added at any of the steps of the deinking process, as long as the step is not one to be effected after flotation. It may be added in a step before flotation, for example, a disintegration step or a bleaching step, or alternatively added just before flotaion or during flotation (e.g., in an early stage of the flotation step). Preferably, the cationic compound, amine, acid salt of amine or amphoteric compound is added to the slurry just before flotaion or during flotation, and after adjusting the pH of the slurry to a value in a range of from 4 to 9. In this case, the cationic compound, amine, acid salt of amine or amphoteric compound is preferably used in such an amount that the pH of the system for flotation is scarcely altered by the addition thereof. "The pH of the system for flotation is scarcely altered" refers that the alteration of the pH of the system is not recognized or recognized only in two places of decimals in the determination of pH. The amount of the cationic compound, amine, acid salt of amine or amphoteric compound that the pH of the flotation system is scarcely altered by the addition thereof is, e.g., from 0.01 to 1.0% by weight based on the weight (i.e., the absoluted dry weight) of waste paper.

The flotation step may comprise two or more steps when, for example, the flotation system is circulated. In such a case, the pH of the system has to be regulated to a value in a range of from 4 to 9 at least one flotation step. It is preferred that the pH of the system in the step, among steps of flotation, immediately before the washing step is regulated as described above. At least one member selected from the group consisting of cationic compounds, amines, acid salts of amines and amphoteric compounds also has to be present in the system having a pH of from 4 to 9 in at least one step of flotation.

In the deinking method of the present invention, the calcium ion concentration of the system, i.e., the slurry, in flotation is not specifically restricted. In order to obtain a reclaimed pulp having a higher quality, however, the calcium ion concentration of the system in flotation is preferably controlled to a value in the range of from 10 to 400 ppm, particularly from 100 to 250 ppm. When the calcium ion concentration falls within the above-mentioned range, fine drops of ink can be selectively flocculated one another to give ink drops having an optimum size for flotation reject. Therefore, ink is easily rejected by foltaion to give a reclaimed pulp having a higher whiteness and a less residual ink spots.

For the regulation of the calcium ion concentration of the system, inorganic calcium salts such as calcium chloride and calcium carbonate, and minerals such as lime can be used. Further, an animal bone, a shell or the like may be used as the sourse of the calcium ion. In such a case, the animal bone or the like is reacted with an acid to thereby ionize. Although the calcium ion concentration of the system in flotation is preferably regulated to a value in the above-mentioned range, the calcium ion concentration of the system in any step other than the flotation step is not restricted. Therefore, the calcium ion concentration of the system may be adjusted in any step (such as the pulping step) prior to the flotation step, as far as the liberation of ink is not affected.

In the deinking method of the present invention, the aluminum ion concentration of the system in flotation is desirably regulated to 40 ppm or less, particularly 25 ppm or less. For the regulation of the aluminum ion concentration of the system, it is preferred to take the kind and amount of water used in flotation into consideration. For example, white water resulting from paper-making and/or city water are used in a suitable amount. When the aluminum ion concentration of the system in flotation is regulated as described above, not only both an improvement in the whiteness of the reclaimed pulp and a decrease of the residual ink spots of the reclaimed paper are achieved, but also the recovery of pulp is enhanced. Although the aluminum ion concentration of the system in flotation is preferably regulated to a value in the above-mentioned range, the aluminum ion concentration of the system in any step other than the flotation step is not restricted. Therefore, the aluminum ion concentration of the system may be adjusted in any step (such as the pulping step) prior to the flotation step, as far as the liberation of ink is not affected.

The deinking method of the present invention described above is characterized in that at least one of nonionic surfactants (A) to (D) is used, and that at least part of the flotation step is effected in the presence of at least one member selected from the group consisting of cationic compounds, amines, acid salts of amines and amphoteric compounds at a pH in a range of from 4 to 9; and comprises at least steps of liberating ink from waste paper and removing the liberated ink from a flotation system. Other steps can be carried out according to the conventional deinking method. That is, the deinking method may comprise, as the main steps, a disintegrating (or pulping) step, an aging step, (a kneading step, if necessary), a flotation step and a washing step. The deinking method may further comprise other step(s), if necessary. The respective steps may be carried out two or more times.

According to the present invention, deinked pulp having a higher whiteness and a less residual ink spots can be obtained from waste paper as the raw material. Therefore, it becomes possible to reduce the production cost of the deinked pulp since bleaching chemicals such as caustic soda, sodium silicate, hydrogen peroxide and chelating agents are necessitated in only small amounts. and the recovery of pulp is increased.

Although the mechanism why the deinking method of the present invention exhibits such an excellent deinking effect is not necessarily clarified, it is considered as follows:

That is, ink is sufficiently liberated from pulp by using a nonionic surfactant as the deinking agent and, further, the reduction of the pH of the system before or during flotation brings about an alteration in conditions of the interface between pulp and ink to cause existing a cationic compound, an amine, an acid salt of an amine or an amphoteric compound to adsorb preferentially on the ink, thereby aggregating ink by the cohesion of the cationic compounds (amines, acid salts of amines or amphoteric compounds) therebetween at their hydrophobic portions. In this case, the presence of the nonionic surfactant in the system prevents the re-adhesion of ink to pulp. When the nonionic surfactant is not present in the system, the cationic compound or the like adsorbs on both ink and pulp, which results in causing the re-adhesion of ink to the pulp.

In any event, there are essentials in the deinking method of the present invention that (1) a nonionic surfactant is used as a deinking agent, (2) the pH of the system is regulated to a low value in the presence of the above nonionic surfactant, and (3) aggregation of ink is carried out with a cationic compound, an amine, an acid salt of an amine or an amphoteric compound.

EXAMPLES

The present invention will be described in detail with reference to the following Examples which should not be considered to limit the present invention.

<Cationic Compounds>

The cationic compounds used in the following Examples I-1 to I-10 will be shown in the following Tables I-1 to I-5.

In Tables I-1 to I-5, each numeral in the columns of $R_1$ to $R_6$, $R_{6a}$ and $R_{6b}$ means the carbon atom number of a linear alkyl group as a substituent; and "18 Fl", "18 Hyd" and "12 Hyd" refer oleyl group, β-hydroxystearyl group and β-hydroxylauryl group, respectively.

Further, in the following Examples, "EO" and "PO" refer oxyethylene group and oxypropylene group, respectively; and the subscript refers an average molar number of ethylene oxide or propylene oxide added.

TABLE I-1

| General formula | Compd. No. | \multicolumn{5}{c}{Substituent and counter ion} |
|---|---|---|---|---|---|---|
| | | $R_1$ | $R_2$ | $R_3$ | $R_4$ | $X^-$ |
| $\left(\begin{array}{cc} R_1 & R_a \\ \diagdown & \diagup \\ & N \\ \diagup & \diagdown \\ R_2 & R_4 \end{array}\right)^+ X^-$ | $a_1$-1 | 10 | 24 | 1 | 1 | $Cl^-$ |
| | $a_1$-2 | 12 | 12 | 1 | 2 | $Br^-$ |
| | $a_1$-3 | 12 | 18 | 1 | 1 | $CH_3COO^-$ |
| | $a_1$-4 | 12 | 12 | 8 | 8 | $1/2\ SO_4^{2-}$ |
| | $a_1$-5 | 18 | 18 | 2 | 2 | $Cl^-$ |
| | $a_1$-6 | 18 | 18 | 4 | 4 | $Cl^-$ |
| | $a_1$-7 | 18 | 18 Hyd | 2 | 2 | $Cl^-$ |
| | $a_1$-8 | 18 Fl | 18 Fl | 2 | 2 | $Cl^-$ |

TABLE I-2

| General formula | Compd. No. | \multicolumn{5}{c}{Substituent and counter ion} |
|---|---|---|---|---|---|---|
| | | $R_3$ | $R_4$ | $R_5$ | $R_6$ | $X^-$ |
| $\left(\begin{array}{cc} R_6 & R_a \\ \diagdown & \diagup \\ & N \\ \diagup & \diagdown \\ R_3 & R_4 \end{array}\right)^+ X^-$ | $b_1$-1 | 1 | 1 | 1 | 12 | $Cl^-$ |
| | $b_1$-2 | 1 | 1 | 8 | 12 | $Br^-$ |
| | $b_1$-3 | 1 | 1 | 1 | 18 | $CH_3COO^-$ |
| | $b_1$-4 | 1 | 4 | 4 | 18 | $1/2\ SO_4^{2-}$ |
| | $b_1$-5 | 4 | 1 | benzyl | 18 | $Cl^-$ |
| | $b_1$-6 | 1 | 2 | 2 | 22 | $Cl^-$ |
| | $b_1$-7 | 2 | 1 | 1 | 34 | $Cl^-$ |
| | $b_1$-8 | 1 | 1 | 1 | 12 Hyd | $Cl^-$ |
| | $b_1$-9 | 1 | 1 | 1 | 18 Fl | $Cl^-$ |
| | $b_1$-10 | 1 | 1 | $(EO)_{50}$-H | 18 | $Cl^-$ |
| | $b_1$-11 | 1 | 1 | $(EO)_{50}$-H | 18 | $Cl^-$ |
| | $b_1$-12 | 1 | $(EO)_{20}$-H | $(EO)_{50}$-H | 18 | $Cl^-$ |
| | | $(EO)_{20}$-H | $(EO)_{20}$-H | | | |

TABLE I-3

| General formula | Compound No. | Substituent and counter ion | |
|---|---|---|---|
| | | Y | $X^-$ |
| $Y-N^+\!\!\!\bigcirc\ \ X^-$ | $c_1$-1 | $C_8H_{17}COOCH_2$ | $Cl^-$ |
| | $c_1$-2 | $C_{12}H_{25}CONHCH_2$ | $Cl^-$ |
| | $c_1$-3 | $C_{18}H_{37}OCH_2$ | $Br^-$ |
| | $c_1$-4 | $C_{12}H_{25}$ | $Br^-$ |

TABLE I-4

| General formula | Compound No. | Substituent and counter ion | | |
|---|---|---|---|---|
| | | $R_3$ | $R_6$ | $X^-$ |
| $R_6COOCH_2CH_2N^+\!\!\begin{array}{l}\diagup CH_2CH_2OH \\ \diagdown R_3 \\ \phantom{\diagdown}CH_2CH_2OH\end{array}\ X^-$ | $d_1$-1 | 1 | 12 | $Cl^-$ |
| | $d_1$-2 | 4 | 18 Fl | $Cl^-$ |
| | $d_1$-3 | 8 | 22 | $Br^-$ |

TABLE I-5

| General formula | Compound No. | Substituent and counter ion | | |
|---|---|---|---|---|
| | | $R_{6a}$ | $R_{6b}$ | $X^-$ |
| $R_{6b}\!-\!O\!-\!CH_2CH_2N^+\!\!\begin{array}{l}\diagup CH_2CH_2OH \\ \diagdown R_{6a} \\ \phantom{\diagdown}CH_2CH_2OH\end{array}\ X^-$ | $e_1$-1 | 12 | 12 | $Cl^-$ |
| | $e_1$-2 | 18 | 18 Fl | $Cl^-$ |
| | $e_1$-3 | 12 | 22 | $Br^-$ |

Example I-1

Waste papers (news papers/leaflets=75/25) recovered in a city were cut into pieces (2×5 cm). A given amount thereof was fed into a bench disintegrator. Then, warm water, 1% by weight (based on the waste papers) of caustic soda, 3% by weight (based on the waste papers) of sodium silicate, 3% by weight (based on the waste papers) of 30% by weight aqueous solution of hydrogen peroxide and 0.2% by weight (based on the waste papers) of an $EO_{10}/PO_{10}$ block adduct of stearyl alcohol as a deinking agent were added thereto to prepare a mixture. The waste papers in the mixture were disintegrated at 40° C. for 10 minutes to prepare a pulp slurry having a pulp concentration of 5% by weight. The resulting pulp slurry was maintained at 40° C. for 60 minutes, and then warm water was added to the pulp slurry.

Thus, a pulp slurry having a pulp concentration of 1% by weight was prepared. Hydrochloric acid was added to the pulp slurry to adjust the pH thereof to a value shown in Table I-6. To the pulp slurry, a cationic compound shown in Table I-1 or I-2, and Table I-6 was further added in an amount shown in Table I-6. By the addition of the cationic compound, the pH of the resulting pulp slurry was scarcely altered. After sampling from the resulting pulp slurry (before flotation), the pulp slurry was subjected to flotation at 40° C. for 10 minutes to prepare a pulp slurry (after flotation).

The whitenesses of the pulp sheet prepared from the pulp slurry (before flotation) and the pulp slurry (after flotation) were measured. The residual ink area ratio of the pulp sheet obtained from the pulp slurry (after flotation) was also measured. Specially, aluminum sulfate was added to each of the pulp slurry (before flotation) and the pulp slurry (after flotation) to adjust the pH thereof to 5, and the resulting pulp slurries were each treated on a TAPPI standard sheet machine to give pulp sheet. The pulp sheet thus obtained were dried under airing. The whitenesses of the resulting pulp sheet were determined with a color-difference meter, and the residual ink area ratio of the pulp sheet obtained from the pulp slurry (after flotation) was determined with an image analyzer (magnification:×100).

An increase by 1% in the whiteness of the pulp sheet and a reduction by 0.1% in the residual ink area ratio thereof can be recognized with naked eyes such that the quality of the pulp sheet was sufficiently improved.

The recovery of pulp in flotation was determined from the absolute dry weight of the pulp contained in the pulp slurry before flotation and the absolute dry weight of the pulp contained in flotation reject [i.e., [(the absolute dry weight of the pulp contained in the pulp slurry before flotation)−(the absolute dry weight of the pulp contained in flotation reject)]×100/(the absolute dry weight of the pulp contained in the pulp slurry before flotation)]. The results thereof are shown in Table I-6.

TABLE I-6

| Test No. | Cationic compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 1 | None | — | 10.0 | 45.0 | 52.2 | 0.752 | 86.8 |
| 2 | None | — | 9.0 | 45.4 | 52.8 | 0.683 | 87.2 |
| 3 | None | — | 8.0 | 44.9 | 53.3 | 0.411 | 88.3 |
| 4 | None | — | 7.0 | 45.6 | 53.6 | 0.365 | 88.9 |
| 5 | None | — | 6.0 | 45.0 | 54.0 | 0.329 | 88.9 |
| 6 | None | — | 5.0 | 44.6 | 53.1 | 0.431 | 89.1 |
| 7 | None | — | 4.0 | 44.3 | 52.9 | 0.625 | 87.6 |
| 8 | $a_1$-4 | 0.10 | 9.0 | 45.0 | 55.7 | 0.252 | 89.2 |
| 9 | $a_1$-4 | 0.10 | 8.0 | 44.8 | 57.4 | 0.151 | 89.0 |
| 10 | $a_1$-4 | 0.10 | 7.0 | 44.6 | 57.2 | 0.149 | 93.1 |
| 11 | $a_1$-4 | 0.10 | 6.0 | 44.7 | 56.8 | 0.179 | 92.5 |
| 12 | $a_1$-4 | 0.10 | 5.0 | 44.3 | 56.6 | 0.221 | 92.7 |
| 13 | $b_1$-1 | 0.10 | 4.0 | 44.3 | 56.0 | 0.239 | 91.3 |
| 14 | $b_1$-1 | 0.06 | 9.0 | 45.5 | 55.9 | 0.247 | 88.9 |
| 15 | $b_1$-1 | 0.06 | 8.0 | 45.0 | 57.7 | 0.147 | 88.8 |
| 16 | $b_1$-1 | 0.06 | 7.0 | 45.1 | 57.4 | 0.146 | 93.0 |
| 17 | $b_1$-1 | 0.06 | 6.0 | 44.9 | 57.1 | 0.167 | 92.3 |
| 18 | $b_1$-1 | 0.06 | 5.0 | 44.8 | 56.9 | 0.215 | 92.4 |
| 19 | $b_1$-1 | 0.06 | 4.0 | 44.2 | 56.3 | 0.243 | 91.3 |
| 20 | $b_1$-11 | 0.03 | 9.0 | 45.1 | 55.8 | 0.242 | 87.8 |
| 21 | $b_1$-11 | 0.03 | 8.0 | 45.0 | 58.0 | 0.136 | 87.4 |
| 22 | $b_1$-11 | 0.03 | 7.0 | 44.7 | 57.7 | 0.144 | 91.3 |
| 23 | $b_1$-11 | 0.03 | 6.0 | 44.7 | 57.4 | 0.150 | 90.7 |
| 24 | $b_1$-11 | 0.03 | 5.0 | 44.5 | 56.8 | 0.199 | 91.2 |
| 25 | $b_1$-11 | 0.03 | 4.0 | 44.3 | 56.2 | 0.215 | 89.9 |

In the Tests described above, Test No. 1 is effected in a similar manner as that of a conventional industrial deinking method. According to the methods of Test Nos. 8 to 25 (the methods of the present invention) wherein the flotation is effected in the presence of a cationic compound at a specific pH, as compared with those of Test Nos. 1 to 7 (comparative methods), there can be expected to attain an improvement in whiteness of the reclaimed paper, a reduction of residual ink spots in the reclaimed paper and an increase in the recovery of pulp, by the selective removal of ink in flotation.

Example I-2

Deinking test was carried out according to the method described in Example I-1 by using cationic compounds shown in Tables I-1 and I-7. The result are shown in Table I-7.

TABLE I-7

| Test No. | Cationic compound Compound No. | Cationic compound Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 26 | None | — | 10.0 | 45.1 | 52.3 | 0.749 | 86.8 |
| 27 | None | — | 7.0 | 45.3 | 54.6 | 0.431 | 88.8 |
| 28 | $a_1$-1 | 0.10 | 7.0 | 45.2 | 57.4 | 0.144 | 92.3 |
| 29 | $a_1$-2 | 0.10 | 7.0 | 45.0 | 57.2 | 0.151 | 92.2 |
| 30 | $a_1$-3 | 0.10 | 7.0 | 45.2 | 57.2 | 0.148 | 92.1 |
| 31 | $a_1$-4 | 0.10 | 7.0 | 44.6 | 57.2 | 0.155 | 93.3 |
| 32 | $a_1$-5 | 0.10 | 7.0 | 45.2 | 57.4 | 0.148 | 92.7 |
| 33 | $a_1$-6 | 0.10 | 7.0 | 45.2 | 57.6 | 0.147 | 93.4 |
| 34 | $a_1$-7 | 0.10 | 7.0 | 45.2 | 57.4 | 0.142 | 92.0 |
| 35 | $a_1$-8 | 0.10 | 7.0 | 45.1 | 57.3 | 0.146 | 92.7 |

According to the methods of Test Nos. 28 to 35 (the methods of the present invention) wherein the flotation is effected in the presence of a cationic compound shown in Table I-1 at a specific pH, as compared with those of Test Nos. 26 and 27 (comparative methods), there can be expected to attain an improvement in whiteness of the reclaimed paper, a reduction of residual ink spots in the reclaimed paper and an increase in the recovery of pulp, by the selective removal of ink in flotation.

Example I-3

Deinking test was carried out according to the method described in Example I-1 by using cationic compounds shown in Tables I-2 and I-8. The results are shown in Table I-8.

According to the methods of Test Nos. 38 to 51 (the methods of the present invention) wherein the flotation is effected in the presence of a cationic compound shown in Table I-2 at a specific pH, as compared with those of Test Nos. 36 and 37 (comparative methods), there can be expected to attain an improvement in whiteness of the reclaimed paper, a reduction of residual ink spots in the reclaimed paper and an increase in the recovery of pulp, by the selective removal of ink in flotation.

Example I-4

Deinking test was carried out according to the method described in Example I-1 by using cationic compounds shown in Tables I-3 and I-9. An $EO_{20}$ adduct pf stearic acid was used as the deinking agent in the present Example. The results are shown in Table I-9.

TABLE I-8

| Test No. | Cationic compound Compound No. | Cationic compound Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 36 | None | — | 10.0 | 45.0 | 52.3 | 0.744 | 86.9 |
| 37 | None | — | 7.0 | 45.2 | 54.3 | 0.446 | 88.8 |
| 38 | $b_1$-1 | 0.10 | 7.0 | 45.1 | 57.2 | 0.157 | 91.7 |
| 39 | $b_1$-2 | 0.10 | 7.0 | 45.1 | 57.8 | 0.143 | 92.4 |
| 40 | $b_1$-3 | 0.10 | 7.0 | 45.0 | 58.0 | 0.101 | 92.6 |
| 41 | $b_1$-3 | 0.10 | 7.0 | 44.9 | 57.3 | 0.145 | 92.7 |
| 42 | $b_1$-5 | 0.10 | 7.0 | 44.8 | 57.6 | 0.143 | 92.1 |
| 43 | $b_1$-6 | 0.10 | 7.0 | 45.0 | 57.0 | 0.165 | 92.8 |
| 44 | $b_1$-7 | 0.10 | 7.0 | 45.2 | 58.0 | 0.137 | 93.2 |
| 45 | $b_1$-8 | 0.10 | 7.0 | 45.4 | 57.5 | 0.148 | 92.3 |
| 46 | $b_1$-9 | 0.10 | 7.0 | 45.3 | 57.7 | 0.146 | 92.9 |
| 47 | $b_1$-10 | 0.10 | 7.0 | 45.2 | 57.2 | 0.151 | 91.6 |
| 48 | $b_1$-11 | 0.10 | 7.0 | 45.0 | 57.6 | 0.143 | 91.4 |
| 49 | $b_1$-12 | 0.05 | 7.0 | 45.0 | 57.1 | 0.156 | 92.3 |
| 50 | $b_1$-12 | 0.10 | 7.0 | 45.0 | 57.9 | 0.135 | 91.9 |
| 51 | $b_1$-12 | 0.20 | 7.0 | 45.1 | 59.2 | 0.123 | 91.0 |

TABLE I-9

| Test No. | Cationic compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 52 | None | — | 10.0 | 45.1 | 52.0 | 0.772 | 86.8 |
| 53 | None | — | 7.0 | 45.4 | 54.1 | 0.465 | 88.2 |
| 54 | $c_1$-1 | 0.05 | 7.0 | 45.9 | 57.3 | 0.153 | 92.1 |
| 55 | $c_1$-2 | 0.05 | 7.0 | 45.2 | 56.9 | 0.158 | 92.0 |
| 56 | $c_1$-3 | 0.05 | 7.0 | 45.1 | 57.2 | 0.155 | 92.1 |
| 57 | $c_1$-4 | 0.05 | 7.0 | 45.1 | 57.6 | 0.149 | 91.0 |

According to the methods of Test Nos. 54 to 57 (the methods of the present invention) wherein the flotation is effected in the presence of a cationic compound shown in Table I-3 at a specific pH, as compared with those of Test Nos. 52 and 53 (comparative methods), there can be expected to attain an improvement in whiteness of the reclaimed paper, a reduction of residual ink spots in the reclaimed paper and an increase in the recovery of pulp, by the selective removal of ink in flotation.

Example I-5

Deinking test was carried out according to the method described in Example I-1 by using cationic compounds shown in Tables I-4 and I-10. An $EO_{60}$ adduct of a mixture (1:1 by mole) of beef tallow and glycerol was used as the deinking agent in the present Example. The results are shown in Table I-10.

TABLE I-10

| Test No. | Cationic compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 58 | None | — | 10.0 | 45.0 | 51.7 | 0.704 | 85.7 |
| 59 | None | — | 7.0 | 45.4 | 53.8 | 0.411 | 86.6 |
| 60 | $d_1$-1 | 0.10 | 7.0 | 44.9 | 57.6 | 0.142 | 92.2 |
| 61 | $d_1$-2 | 0.10 | 7.0 | 45.3 | 57.2 | 0.147 | 92.4 |
| 62 | $d_1$-3 | 0.10 | 7.0 | 45.2 | 56.9 | 0.152 | 92.1 |

According to the methods of Test Nos. 60 to 62 (the methods of the present invention) wherein the floation is effected in the presence of a cationic compound shown in Table I-4 at a specific pH, as compared with those of Test Nos. 58 and 59 (comparative methods), there can be expected to attain an improvement in whiteness of the reclaimed paper, a reduction of residual ink spots in the reclaimed paper and an increase in the recovery of pulp, by the selective removal of ink in flotation.

Example I-6

Deinking test was carried out according to the method described in Example I-1 by using cationic compounds shown in Tables I-1, I-2 and I-5, and I-11. The results are shown in Table I-11.

TABLE I-11

| Test No. | Cationic compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 63 | None | — | 10.0 | 45.1 | 52.2 | 0.759 | 86.8 |
| 64 | None | — | 7.0 | 45.3 | 54.4 | 0.434 | 88.3 |
| 65 | $e_1$-1 | 0.10 | 7.0 | 45.1 | 57.6 | 0.145 | 92.1 |

TABLE I-11-continued

| Test No. | Cationic compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 66 | $e_1$-2 | 0.10 | 7.0 | 45.0 | 57.4 | 0.151 | 92.9 |
| 67 | $e_1$-3 | 0.10 | 7.0 | 44.9 | 56.9 | 0.153 | 92.8 |
| 68 | $a_1$-2/ $e_1$-1 | 0.05/0.05 | 7.0 | 45.3 | 57.8 | 0.142 | 92.5 |
| 69 | $b_1$-1/ $e_1$-2 | 0.07/0.03 | 7.0 | 45.2 | 57.7 | 0.145 | 92.6 |

According to the methods of Test Nos. 65 to 69 (the methods of the present invention) wherein the flotation is effected in the presence of a cationic compound shown in Table I-5 optionally together with a cationic compound shown in Table I-1 or I-2 at a specific pH, as compared with those of Test Nos. 63 and 64 (comparative methods), there can be expected to attain an improvement in whiteness of the reclaimed paper, a reduction of residual ink spots in the reclaimed paper and an increase in the recovery of pulp, by the selective removal of ink in flotation.

Example I-7

Waste papers (news papers/leaflets=75/25) recovered in a city were cut into pieces (2×5 cm). A given amount thereof was fed into a disintegrator for a high concentration. Then, warm water, 1% by weight (based on the waste papers) of caustic soda, 3% by weight (based on the waste papers) of sodium silicate, 3% by weight (based on the waste papers) of 30% by weight aqueous solution of hydrogen peroxide and a deinking agent of Table I-12 in an amount given in Table I-13 were added thereto to prepare a mixture. The waste papers in the mixture were disintegrated at 40° C. for 10 minutes to prepare a pulp slurry having a pulp concentration of 15% by weight. Warm water was added to the pulp slurry to prepare a pulp slurry having a pulp concentration of 4% by weight. The resulting pulp slurry was maintained at 40° C. for 60 minutes, and then warm water was added to the pulp slurry. Thus, a pulp slurry having a pulp concentration of 1% by weight was prepared. Sulfuric acid was added to the pulp slurry to adjust the pH thereof to a value shown in Table I-13. To the pulp slurry, a cationic compound shown in Table I-1, I-2 or I-3, and Table I-13 was further added in an amount shown in Table I-13. By the addition of the cationic compound, the pH of the resulting pulp slurry was scarcely altered. After sampling from the resulting pulp slurry (before flotation), the pulp slurry was subjected to flotation at 40° C. for 10 minutes to prepare a pulp slurry (after flotation). The pulp slurries were subjected to paper-making in the same manner as that in Example I-1.

The performances of the pulp sheet thus obtained were evaluated in the same manner as that in Example I-1. The results thereof are shown in Table I-13.

TABLE I-12

| Deinking agent No. | Deinking agent | Amount added (based on waste papers) |
|---|---|---|
| A1 | an $EO_{10}/PO_{10}$ random adduct of stearic acid | 0.2% |
| A2 | an $EO_{30}/PO_{25}$ block adduct of dimer acid | 0.3% |
| A3 | an $EO_{70}/PO_{20}$ block adduct of a mixture (1:1 by mole) of beef tallow and glycerol | 0.3% |
| A4 | Stearic acid | 0.5% |

TABLE I-13

| Test No. | Deinking agent No. (See Table I-12) | Amine and acid salt of amine Compd. No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|---|
| 70 | A1 | None | — | 10.0 | 43.9 | 51.0 | 0.841 | 88.5 |
| 71 | A2 | None | — | 10.0 | 44.0 | 52.2 | 0.785 | 86.5 |
| 72 | A3 | None | — | 10.0 | 44.6 | 52.1 | 0.771 | 86.2 |
| 73 | A4 | None | — | 10.0 | 47.8 | 53.5 | 0.415 | 90.0 |
| 74 | A1 | $a_1$-1 | 0.10 | 7.0 | 44.2 | 56.3 | 0.204 | 92.1 |
| 75 | A2 | $a_1$-2 | 0.10 | 7.0 | 44.5 | 57.5 | 0.155 | 90.7 |
| 76 | A3 | $b_1$-6 | 0.10 | 7.0 | 44.6 | 57.2 | 0.163 | 89.9 |
| 77 | A4 | $c_1$-1 | 0.05 | 7.0 | 47.2 | 58.6 | 0.150 | 93.6 |

According to the methods of Test Nos. 74 to 77 (the methods of the present invention) wherein various deinking agents are each used and the flotation is effected in the presence of a cationic compound at a specific pH, as compared with those of Test Nos. 70 to 73 (comparative methods), there can be expected to attain an improvement in whiteness of the reclaimed paper, a reduction of residual ink spots in the reclaimed paper and an increase in the recovery of pulp.

Example I-8

Waste papers (news papers/leaflets=75/25) recovered in a city were cut into pieces (2×5 cm). A given amount thereof was fed into a bench disintegrator. Then, warm water, 1% by weight (based on the waste papers) of caustic soda, 3% by weight (based on the waste papers) of sodium silicate, 3% by weight (based on the waste papers) of 30% by weight aqueous solution of hydrogen peroxide and 0.2% by weight (based on the waste papers) of an $EO_{10}/PO_{10}$ block adduct of stearyl alcohol as a deinking agent were added thereto to prepare a mixture. The waste papers in the mixture were disintegrated at 40° C. for 10 minutes to prepare a pulp slurry having a pulp concentration of 5% by weight. The resulting pulp slurry was maintained at 40° C. for 60 minutes, and then warm water was added to the pulp slurry to give a pulp slurry having a pulp concentration of 1% by weight and a $Ca^{2+}$ ion concentration given in Table I-14. The $Ca^{2+}$ ion concentration of the warm water had been adjusted with $CaCl_2$ so as to give the $Ca^{2+}$ ion concentration of the resulting pulp slurry shown in Table I-14. Then, hydrochloric acid was added to the resulting pulp slurry to adjust the pH thereof to a value shown in Table I-14. To the resulting pulp slurry, a cationic compound shown in Table I-1 or I-2, and Table I-14 was further added in an amount shown in Table I-14. By the addition of the cationic compound, the pH of the resulting pulp slurry was scarcely altered. After sampling from the resulting pulp slurry (before flotation), the pulp slurry was subjected to flotation at 40° C. for 10 minutes to prepare a pulp slurry (after flotation). The pulp slurries were subjected to paper-making in the same manner as that in Example I-1.

The performances of the pulp sheet thus obtained were evaluated in the same manner as that in Example I-1. The results thereof are shown in Table I-14.

TABLE I-14

| Test No. | Cationic compound Compound No. | Amount added (%) | pH in flotation | $Ca^{2+}$ ion concentration (ppm) | Whiteness (%) Before flotation | Whiteness (%) After flotation | Residual ink area ratio (%) After flotation | Recovery of pulp (%) |
|---|---|---|---|---|---|---|---|---|
| 78 | None | — | 10.0 | 0 | 44.8 | 52.1 | 0.770 | 86.4 |
| 79 | None | — | 10.0 | 50 | 45.0 | 52.2 | 0.752 | 86.8 |
| 80 | None | — | 10.0 | 100 | 45.3 | 52.5 | 0.743 | 87.3 |
| 81 | None | — | 10.0 | 200 | 45.2 | 52.6 | 0.739 | 87.3 |
| 82 | None | — | 10.0 | 400 | 45.0 | 52.3 | 0.765 | 87.6 |
| 83 | None | — | 10.0 | 800 | 44.7 | 51.8 | 0.781 | 87.6 |
| 84 | $b_1$-1 | 0.06 | 7.0 | 0 | 44.8 | 57.2 | 0.162 | 93.5 |
| 85 | $b_1$-1 | 0.06 | 7.0 | 50 | 45.2 | 57.5 | n.145 | 93.0 |
| 86 | $b_1$-1 | 0.06 | 7.0 | 100 | 45.3 | 58.4 | 0.091 | 92.7 |
| 87 | $b_1$-1 | 0.06 | 7.0 | 200 | 45.6 | 59.0 | 0.086 | 93.0 |
| 88 | $b_1$-1 | 0.06 | 7.0 | 400 | 45.1 | 57.5 | 0.128 | 93.8 |
| 89 | $b_1$-1 | 0.06 | 7.0 | 800 | 45.1 | 56.4 | 0.221 | 94.1 |
| 90 | $a_1$-4 | 0.10 | 7.0 | 0 | 44.3 | 57.0 | 0.172 | 93.4 |
| 91 | $a_1$-4 | 0.10 | 7.0 | 200 | 45.1 | 58.8 | 0.092 | 93.0 |
| 92 | $a_1$-4 | 0.10 | 7.0 | 800 | 45.0 | 56.2 | 0.229 | 93.9 |
| 93 | $b_1$-11 | 0.03 | 7.0 | 0 | 44.3 | 57.2 | 0.161 | 91.9 |
| 94 | $b_1$-11 | 0.03 | 7.0 | 200 | 45.1 | 59.2 | 0.085 | 92.5 |
| 95 | $b_1$-11 | 0.03 | 7.0 | 800 | 44.6 | 56.6 | 0.219 | 92.7 |

Note) The $Ca^{2+}$ ion concentrations in the above Table were determined in flotation.

According to the methods of Test Nos. 84 to 95 (the methods of the present invention) wherein the flotation is effected in the presence of a cationic compound at a specific pH at a specific $Ca^{2+}$ ion concentration, as compared with those of Test Nos. 78 to 83 (comparative methods), there can be expected to attain an improvement in whiteness of the reclaimed paper, a reduction of residual ink spots in the reclaimed paper and an increase in the recovery of pulp, by the selective removal of ink in flotation.

Example I-9

Waste papers (news papers/leaflets=75/25) recovered in a city were cut into pieces (2×5 cm). A given amount thereof was fed into a bench disintegrator. Then, warm water, 1% by weight (based on the waste papers) of caustic soda, 3% by weight (based on the waste papers) of sodium silicate, 3% by weight (based on the waste papers) of 30% by weight aqueous solution of hydrogen peroxide and 0.2% by weight (based on the waste papers) of an $EO_{10}/PO_{10}$ block adduct of stearyl alcohol as a deinking agent were added thereto to prepare a mixture. The waste papers in the mixture were disintegrated at 40° C. for 10 minutes to prepare a pulp slurry having a pulp concentration of 5% by weight. The resulting pulp slurry was maintained at 40° C. for 60 minutes, and then warm water was added to the pulp slurry to give a pulp slurry having a pulp concentration of 1% by weight, an $Al^{3+}$ ion concentration given in Table I-15 and a $Ca^{2+}$ ion concentration given in Table I-15. The $Al^{3+}$ ion concentration of the warm water had been adjusted with white water resulting from paper-making (with white water and aluminum sulfate in Test Nos. 99, 103 and 107) so as to give the $Al^{3+}$ ion concentration of the resulting pulp slurry shown in Table I-15. The $Ca^{2+}$ ion concentration of the warm water had been adjusted with $CaCl_2$ so as to give the $Ca^{2+}$ ion concentration of the resulting pulp slurry shown in Table I-15. Then, hydrochloric acid or sodium hydroxide was added to the resulting pulp slurry to adjust the pH thereof to a value shown in Table I-15. To the resulting pulp slurry, a cationic compound shown in Table I-1 or I-2, and Table I-15 was further added in an amount shown in Table I-15. By the addition of the cationic compound, the pH of the resulting pulp slurry was scarcely altered. After sampling from the resulting pulp slurry (before flotation), the pulp slurry was subjected to flotation at 40° C. for 10 minutes to prepare a pulp slurry (after flotation). The pulp slurries were subjected to paper-making in the same manner as that in Example I-1.

The performances of the pulp sheet thus obtained were evaluated in the same manner as that in Example I-1. The results thereof are shown in Table I-15.

The waste papers in the mixture were disintegrated at 40° C. for 10 minutes to prepare a pulp slurry having a pulp concentration of 5% by weight. The resulting pulp slurry was maintained at 40° C. for 60 minutes, and then warm water, of which $Al^{3+}$ ion concentration and $Ca^{2+}$ ion concentration had been suitably adjusted, was added to the pulp slurry to give a pulp slurry having a pulp concentration of 1% by weight, an $Al^{3+}$ ion concentration given in Table I-16 and a $Ca^{2+}$ ion concentration given in Table I-16. Hydrochloric acid was added to the pulp slurry to adjust the pH thereof to a value shown in Table I-16. After sampling from the resulting pulp slurry (before flotation), the pulp slurry was subjected to flotation at 40° C. for 10 minutes to prepare

TABLE I-15

| Test No. | Cationic compound Compd. No. | Amount added (%) | pH in flotation | $Al^{3+}$ ion conc. (ppm) | $Ca^{2+}$ ion conc. (ppm) | Whiteness (%) Before flotation | Whiteness (%) After flotation | Residual ink area ratio (%) After flotation | Recovery of pulp (%) |
|---|---|---|---|---|---|---|---|---|---|
| 96 | None | — | 10.0 | 0 | 100 | 45.3 | 52.5 | 0.743 | 87.3 |
| 97 | None | — | 10.0 | 20 | 100 | 45.5 | 52.2 | 0.776 | 85.2 |
| 98 | None | — | 10.0 | 40 | 100 | 44.4 | 5i.9 | 0.802 | 82.7 |
| 99 | None | — | 10.0 | 60 | 100 | 43.4 | 5l.7 | 0.822 | 79.3 |
| 100 | $b_1$-1 | 0.06 | 7.0 | 0 | 100 | 45.3 | 58.4 | 0.091 | 92.7 |
| 101 | $b_1$-1 | 0.06 | 7.0 | 20 | 100 | 45.2 | 57.6 | 0.126 | 90.8 |
| 102 | $b_1$-1 | 0.06 | 7.0 | 49 | 100 | 44.5 | 56.3 | 0.232 | 88.3 |
| 103 | $b_1$-1 | 0.06 | 7.0 | 60 | 100 | 43.4 | 53.8 | 0.497 | 84.9 |
| 104 | $a_1$-4 | 0.10 | 7.0 | 20 | 100 | 44.9 | 57.4 | 0.132 | 90.8 |
| 105 | $a_1$-4 | 0.10 | 7.0 | 60 | 100 | 43.1 | 53.5 | 0.533 | 84.9 |
| 106 | $b_1$-11 | 0.03 | 7.0 | 20 | 100 | 44.7 | 57.8 | 0.125 | 89.3 |
| 107 | $b_1$-11 | 0.03 | 7.0 | 60 | 100 | 42.9 | 53.4 | 0.526 | 83.4 |

Note) The $Al^{3+}$ ion concentrations and the $Ca^{2+}$ ion concentrations in the above Table were determined in flotation.

According to the methods of Test Nos. 100 to 107 (the methods of the present invention) wherein the flotation is effected in the presence of a cationic compound at a specific pH at a specific $Ca^{2+}$ ion concentration, as compared with those of Test Nos. 96 to 99 (comparative methods), an improvement in whiteness of the reclaimed paper, a reduction of residual ink spots in the reclaimed paper and an increase in the recovery of pulp there can be attained. Further, when $Al^{3+}$ ion concentration of the slurry in flotation is 40 ppm or less, it can be expected to obtain qualities superior thereto.

Example I-10

Waste papers (news papers/leaflets=75/25) recovered in a city were treated according to the following deinking methods, and the performances of the pulp sheet thus obtained were evaluated in the same manner as that in Example I-1. The results thereof are shown in Table I-16.

In this Example, the $Ca^{2+}$ ion concentration of the warm water had been adjusted with $CaCl_2$, while the $Al^{3+}$ ion concentration thereof had been adjusted with white water resulting from paper-making.

(1) Test Nos. 108 and 109

To a given amount of waste papers, 1% by weight (based on the waste papers) of caustic soda, 3% by weight (based on the waste papers) of sodium silicate, 3% by weight (based on the waste papers) of 30% by weight aqueous solution of hydrogen peroxide, 0.3% by weight (based on the waste papers) of an $EO_{10}/PO_{10}$ adduct of an amine represented by the following formula (1) as a deinking agent and warm water were added to prepare a mixture:

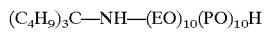 (1).

a pulp slurry (after flotation). The pulp slurries were subjected to paper-making in the same manner as that in Example I-1.

(2) Test Nos. 110 and 111

To a given amount of waste papers, 1% by weight (based on the waste papers) of caustic soda, 3% by weight (based on the waste papers) of sodium silicate, 3% by weight (based on the waste papers) of 30% by weight aqueous solution of hydrogen peroxide, 0.2% by weight (based on the waste papers) of an $EO_{10}/PO_{10}$ block adduct of stearyl alcohol as a deinking agent and warm water were added to prepare a mixture. The waste papers in the mixture were disintegrated at 40° C. for 10 minutes to prepare a pulp slurry having a pulp concentration of 5% by weight. The resulting pulp slurry was maintained at 40° C. for 60 minutes, and then warm water, of which $Al^{3+}$ ion concentration and $Ca^{2+}$ ion concentration had been suitably adjusted, was added to the pulp slurry to give a pulp slurry having a pulp concentration of 1% by weight, an $Al^{3+}$ ion concentration given in Table I-16 and a $Ca^{2+}$ ion concentration given in Table I-16. In Test No. 110, aluminum sulfate was also added to the pulp slurry to adjust the $Al^{3+}$ concentration of the slurry to a value shown in Table I-16. Then, hydrochloric acid was added to the resulting pulp slurry to adjust the pH thereof to a value shown in Table I-16. Further, 0.05% by weight (based on the waste papers) of a nonionic polyacrylamide (NP 800, manufactured by Diafloc Co. Ltd.) was added to the pulp slurry.

By the addition of the nonionic polyacrylamide, the pH of the resulting pulp slurry was scarcely altered. After sampling from the resulting pulp slurry (before flotation), the pulp slurry was subjected to flotation at 40° C. for 10 minutes to prepare a pulp slurry (after flotation). The pulp slurries were subjected to paper-making in the same manner as that in Example I-1.

(3) Test Nos. 112 to 114

To a given amount of waste papers, 1% by weight (based on the waste papers) of caustic soda, 3% by weight (based on the waste papers) of sodium silicate, 3% by weight (based on the waste papers) of 30% by weight aqueous solution of hydrogen peroxide, 0.2% by weight (based on the waste papers) of an $EO_{10}/PO_{10}$ block adduct of stearyl alcohol as a deinking agent and warm water were added to prepare a mixture. The waste papers in the mixture were disintegrated at 40° C. for 10 minutes to prepare a pulp slurry having a pulp concentration of 5% by weight. The resulting pulp slurry was maintained at 40° C. for 60 minutes, and then warm water, of which $Al^{3+}$ ion concentration and $Ca^{2+}$ ion concentration had been suitably adjusted, was added to the pulp slurry to give a pulp slurry having a pulp concentration of 1% by weight, an $Al^{3+}$ ion concentration given in Table I-16 and a $Ca^{2+}$ ion concentration given in Table I-16. Hydrochloric acid was added to the resulting pulp slurry to adjust the pH thereof to a value shown in Table I-16. Further, 0.06% by weight (based on the waste papers) of a cationic compound shown in Table I-1 or I-2, and Table I-16 was added to the pulp slurry. By the addition of the cationic compound, the pH of the resulting pulp slurry was scarcely altered. After sampling from the resulting pulp slurry (before flotation), the pulp slurry was subjected to flotation at 40° C. for 10 minutes to prepare a pulp slurry (after flotation). The pulp slurries were subjected to paper-making in the same manner as that in Example I-1.

It is observed in Test Nos. 108 and 109 (comparative examples) that a lot of non-liberated ink spots which have not been removed from pulp by flotation is present in the reclaimed paper since the deinking agent having a poor power for liberating ink is used in the disintegrating step of waste papers. Accordingly, the reclaimed pulp is poor in quality. In Test Nos. 110 and 111 (comparative examples), the addition of the polyacrylamide optionally with aluminum sulfate causes the re-adhesion of ink to cellulose fibers, and reduces the quality of the reclaimed pulp. Further, it is observed that foaming in flotation is extremely enhanced to deteriorate the recovery of pulp.

In contrast, according to the methods of Test Nos. 112 to 114 (the methods of the present invention) wherein the flotation is effected in the presence of a cationic compound at a specific pH at a specific $Ca^{2+}$ ion concentration and at a specific $Al^{3+}$ ion concentration, an improvement in whiteness of the reclaimed paper, a reduction of residual ink spots in the reclaimed paper and an increase in the recovery of pulp are observed.

Example I-11

Deinking test was carried out according to the method described in Example I-1 by using cationic compound $i_1$-1 represented by the following formula:

TABLE I-16

| Test No. | Nonionic or cationic compound Name or number of compound | pH in flotation | $Al^{3+}$ ion conc. (ppm) | $Ca^{2+}$ ion conc. (ppm) | Whiteness (%) Before flotation | Whiteness (%) After flotation | Residual ink area ratio (%) After flotation | Recovery of pulp (%) |
|---|---|---|---|---|---|---|---|---|
| 108 | None | 4.5 | 30 | 5 | 42.2 | 52.9 | 0.683 | 87.8 |
| 109 | None | 7.0 | 15 | 200 | 42.1 | 52.8 | 0.690 | 87.1 |
| 110 | NP-800 | 4.5 | 60 | 5 | 44.4 | 53.6 | 0.409 | 77.6 |
| 111 | NP-800 | 7.0 | 15 | 200 | 44.6 | 53.4 | 0.418 | 78.2 |
| 112 | $a_1$-3 | 7.0 | 15 | 200 | 45.3 | 57.7 | 0.118 | 91.1 |
| 113 | $b_1$-1 | 7.0 | 15 | 200 | 45.2 | 57.7 | 0.126 | 91.6 |
| 114 | $b_1$-11 | 7.0 | 15 | 200 | 45.3 | 58.1 | 0.114 | 91.5 |

Note) The $Al^{3+}$ ion concentrations and the $Ca^{2+}$ concentrations in the above Table were determined in flotation.

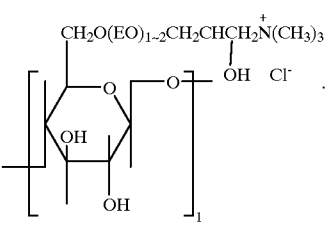

(i$_1$-1)

The result are shown in Table I-17.

TABLE I-17

| | Cationic polymer | | | | Whiteness (%) | | Residual ink area ratio (%) | Recovery |
|---|---|---|---|---|---|---|---|---|
| Test No. | Compd. No. | Content of cationic nitrogen* (%) | weight-average molecular weight | Amount added (%) | pH in flotation | Before flotation | After flotation | After flotation | of pulp (%) |
| 115 | None | — | — | — | 10.0 | 45.0 | 52.2 | 0.752 | 86.8 |
| 116 | None | — | — | — | 9.0 | 45.4 | 52.8 | 0.683 | 87.2 |
| 117 | None | — | — | — | 8.0 | 44.9 | 53.3 | 0.411 | 88.3 |
| 118 | None | — | — | — | 7.0 | 45.6 | 53.6 | 0.365 | 88.9 |
| 119 | None | — | — | — | 6.0 | 45.0 | 54.0 | 0.329 | 88.9 |
| 120 | None | — | — | — | 5.0 | 44.6 | 53.1 | 0.431 | 89.1 |
| 121 | None | — | — | — | 4.0 | 44.3 | 52.9 | 0.625 | 87.6 |
| 122 | $i_1$-1 | 1.50 | 800,000 | 0.01 | 9.0 | 45.2 | 55.8 | 0.260 | 88.7 |
| 123 | $i_1$-1 | 1.50 | 800,000 | 0.01 | 8.0 | 44.6 | 57.5 | 0.149 | 90.5 |
| 124 | $i_1$-1 | 1.50 | 800,000 | 0.01 | 7.0 | 44.7 | 57.8 | 0.142 | 92.7 |
| 125 | $i_1$-1 | 1.50 | 800,000 | 0.01 | 6.0 | 44.6 | 57.2 | 0.153 | 92.4 |
| 126 | $i_1$-1 | 1.50 | 800,000 | 0.01 | 5.0 | 44.4 | 56.5 | 0.214 | 92.1 |
| 127 | $i_1$-1 | 1.50 | 800,000 | 0.01 | 4.0 | 44.4 | 56.3 | 0.221 | 91.0 |

Note) *: The content (%) of cationic nitrogen was calculated by multiplying the nitrogen content (%) determined by Kjeldahl method by the ratio of the cationic nitrogen to the total nitrogen which was determined from the molecular formula of the polymer.

In the Tests described above, Test No. 115 is effected in a similar manner as that of a conventional industrial deinking method. According to the methods of Test Nos. 122 to 127 (the methods of the present invention) wherein the flotation is effected in the presence of a cationic compound at a specific pH, as compared with those of Test Nos. 115 to 121 (comparative methods), there can be expected to attain an improvement in whiteness of the reclaimed paper, a reduction of residual ink spots in the reclaimed paper and an increase in the recovery of pulp, by the selective removal of ink in flotation.

<Amines and Acid Salts Thereof>

The amines and acid salts thereof used in the following Examples II-1 to II-10 will be shown in the following Tables II-1 to II-8.

In Tables II-1 to II-8, each numeral in the columns of $R_1$ to $R_3$ and $W_1$ to $W_4$ means the carbon atom number of a linear alkyl group as a substituent; and "18 Fl", "18 Hyd" and "12 Hyd" refer oleyl group, β-hydroxystearyl group and β-hydroxylauryl group, respectively.

TABLE II-1

| General formula | Compound No. | Substituent | | |
|---|---|---|---|---|
| | | $R_1$ | $R_2$ | $R_3$ |
| $R_1$\ $R_2$—N / $R_3$ | $a_2$-1 | 12 | H | H |
| | $a_2$-2 | 12 | 1 | 1 |
| | $a_2$-3 | 12 | 8 | 1 |
| | $a_2$-4 | 12 | 12 | 12 |
| | $a_2$-5 | 18 | H | H |
| | $a_2$-6 | 18 | 1 | H |
| | $a_2$-7 | 18 | 2 | 2 |
| | $a_2$-8 | 18 | 4 | 4 |
| | $a_2$-9 | 18 | 18 | 1 |
| | $a_2$-10 | 18 Fl | 18 Fl | 1 |
| | $a_2$-11 | 18 Hyd | 1 | 1 |
| | $a_2$-12 | 22 | 1 | H |
| | $a_2$-13 | 22 | 8 | 1 |
| | $a_2$-14 | 22 | 22 | 1 |

TABLE II-2

| General formula | Compound No. | Substituent and acid portion | | | |
|---|---|---|---|---|---|
| | | $R_1$ | $R_2$ | $R_3$ | HA |
| $R_1$\ $R_2$—N·HA / $R_3$ | $b_2$-1 | 12 | H | H | $CH_3COOH$ |
| | $b_2$-2 | 12 | 1 | 1 | HCl |
| | $b_2$-3 | 12 | 8 | 1 | HCl |
| | $b_2$-4 | 12 | 12 | 12 | $HNO_3$ |
| | $b_2$-5 | 18 | H | H | $H_2SO_4$* |
| | $b_2$-6 | 18 | 1 | H | $CH_3COOH$ |
| | $b_2$-7 | 18 | 2 | 2 | $H_2SO_4$* |
| | $b_2$-8 | 18 | 4 | 4 | HCl |
| | $b_2$-9 | 18 | 18 | 1 | HCl |
| | $b_2$-10 | 18 Fl | 18 Fl | 1 | HCl |
| | $b_2$-11 | 18 Hyd | 1 | 1 | HCl |
| | $b_2$-12 | 22 | 1 | H | HCl |
| | $b_2$-13 | 22 | 8 | 1 | HCl |
| | $b_2$-14 | 22 | 22 | 1 | HCl |

Note)
The sulfuric acid was used in an amount of ½ mole per mole of amine.

TABLE II-3

| General formula | Compound No. | Substituent and symbol | | |
|---|---|---|---|---|
| | | $R_1$ | 1 + m | AO EO/PO |
| $R_1N$ (AO)$_l$H \ / (AO)$_m$H | $c_2$-1 | 12 | 4 | 100/0 |
| | $c_2$-2 | 22 | 10 | 0/100 |
| | $c_2$-3 | 18 | 100 | 50/50 |
| | $c_2$-4 | 18 | 300 | 100/0 |
| | $c_2$-5 | 22 | 100 | 70/30 |

Note)
Ethylene oxide and propylene oxide were added at random.

TABLE II-4

| General formula | Compound No. | Substituent and acid portion | |
|---|---|---|---|
| | | $R_1$ | HA |
| $R_1CONHCH_2CH_2NH_2 \cdot HA$ | $d_2$-1 | 12 | HCl |
| | $d_2$-2 | 18 | $CH_3COOH$ |
| | $d_2$-3 | 22 | $H_2SO_4$* |
| | $d_2$-4 | 18 F1 | HCl |
| | $d_2$-5 | 18 Hyd | HCl |

Note) The sulfuric acid was used in an amount of 1/2 mole per mole of amine.

TABLE II-5

| General formula | Compound No. | Substituent and acid portion | |
|---|---|---|---|
| | | $R_1$ | HA |
| $R_1C\underset{NH-CH_2}{\overset{N=CH_2}{\diagdown\!\!\diagup}} \cdot HA$ | $e_2$-1 | 12 | HCl |
| | $e_2$-2 | 18 | HCl |
| | $e_2$-3 | 22 | HCl |

TABLE II-6

| General formula | Compound No. | Substituent and acid portion | |
|---|---|---|---|
| | | $R_1$ | HA |
| $R_1COOCH_2CH_2N\underset{CH_2CH_2OH}{\overset{CH_2CH_2OH}{\diagdown\!\!\diagup}} \cdot HA$ | $f_2$-1 | 12 | HCl |
| | $f_2$-2 | 18 | HCl |
| | $f_2$-3 | 22 | HCl |

TABLE II-7

| General formula | Compound No. | Substituent | | | |
|---|---|---|---|---|---|
| | | $W_1$ | $W_2$ | $W_3$ | $W_4$ |
| (imidazole ring with $W_1, W_2, W_3, W_4$) | $g_2$-1 | 18 | H | H | H |
| | $g_2$-2 | H | 18 | H | H |
| | $g_2$-3 | 1 | H | 12 | |
| | $g_2$-4 | H | H | H | 1 |
| | $g_2$-5 | 1 | 12 | 1 | 22 |
| | $g_2$-6 | H | 22 | H | 18 2 |

TABLE II-8

| General formula | Compound No. | Substituent | | |
|---|---|---|---|---|
| | | $W_1$ | $W_2$ | $W_3$ |
| (thiazole ring with $W_1, W_2, W_3$) | $h_2$-1 | 12 | H | H |
| | $h_2$-2 | H | 18 | 2 |
| | $h_2$-3 | H | 1 | 22 |

Example II-1

Deinking test was carried out in a similar manner as that in Example I-1 except that the pH of the pulp slurries were each adjusted to a value shown in Table II-9 and that amines and acid salts of amines shown in Tables II-1 and II-2, and Table II-9 were used instead of the cationic compounds. By the addition of the amine or the acid salt of an amine, the pH of the slurry was scarcely altered (the same will be applied to the following Examples II-2 to II-10).

The results thereof are shown in Table II-9.

TABLE II-9

| Test No. | Amine or acid salt of amine | | pH in flotation | Whiteness (%) | | Residual ink area ratio (%) After flotation | Recovery of pulp (%) |
|---|---|---|---|---|---|---|---|
| | Compound No. | Amount added (%) | | Before flotation | After flotation | | |
| 1 | None | — | 10.0 | 45.0 | 52.2 | 0.752 | 86.8 |
| 2 | None | — | 9.0 | 45.4 | 52.8 | 0.683 | 87.2 |
| 3 | None | — | 8.0 | 44.9 | 53.3 | 0.414 | 88.3 |
| 4 | None | — | 7.0 | 45.5 | 53.6 | 0.365 | 88.9 |

TABLE II-9-continued

| Test No. | Amine or acid salt of amine Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 5 | None | — | 6.0 | 45.0 | 54.0 | 0.329 | 88.9 |
| 6 | None | — | 5.0 | 44.6 | 53.1 | 0.431 | 89.1 |
| 7 | None | — | 4.0 | 44.3 | 52.9 | 0.625 | 87.6 |
| 8 | $a_2$-1 | 0.10 | 9.0 | 45.7 | 56.0 | 0.240 | 89.0 |
| 9 | $a_2$-1 | 0.10 | 8.0 | 45.3 | 56.9 | O:149 | 88.7 |
| 10 | $a_2$-1 | 0.10 | 7.0 | 45.3 | 57.7 | 0.144 | 92.9 |
| 11 | $a_2$-1 | 0.10 | 6.0 | 45.2 | 57.3 | 0.166 | 92.2 |
| 12 | $a_2$-1 | 0.10 | 5.0 | 45.0 | 57.0 | 0.210 | 92.5 |
| 13 | $a_2$-1 | 0.10 | 4.0 | 44.5 | 56.3 | 0.227 | 91.2 |
| 14 | $a_2$-2 | 0.06 | 9.0 | 45.3 | 55.9 | 0.247 | 89.3 |
| 15 | $a_2$-2 | 0.06 | 8.0 | 45.0 | 57.7 | 0.156 | 88.9 |
| 16 | $a_2$-2 | 0.06 | 7.a | 44.g | 57.6 | 0.147 | 93.2 |
| 17 | $a_2$-2 | 0.06 | 6.0 | 44.9 | 57.1 | 0.173 | 92.4 |
| 18 | $a_2$-2 | 0.06 | 5.0 | 44.6 | 56.8 | 0.215 | 92.8 |
| 19 | $a_2$-2 | 0.06 | 4.0 | 44.5 | 56.1 | 0.233 | 91.4 |
| 20 | $b_2$-6 | 0.03 | 9.0 | 45.2 | 55.6 | 0.244 | 87.7 |
| 21 | $b_2$-6 | 0.03 | 8.0 | 45.0 | 57.7 | 0.154 | 87.3 |
| 22 | $b_2$-6 | 0.03 | 7.0 | 44.8 | 57.3 | 0.149 | 91.4 |
| 23 | $b_2$-6 | 0.03 | 6.0 | 44.9 | 57.1 | 0.170 | 90.8 |
| 24 | $b_2$-6 | 0.03 | 5.0 | 44.5 | 56.6 | 0.214 | 91.3 |
| 25 | $b_2$-6 | 0.03 | 4.0 | 44.2 | 56.1 | 0.230 | 90.0 |

Note) The amount of the amine or acid salt thereof is expressed by % by weight based on the waste papers (i.e., the absoluted dry weight of the waste papers). The same will be applied to the following Examples II-2 to II-10.

In the tests described above, Test No. 1 is effected in a similar manner as that of a conventional industrial deinking method. According to the methods of Test Nos. 8 to 25 (the methods of the present invention) wherein the flotation is effected in the presence of an amine or an acid salt of an amine at a specific pH, as compared with those of Test Nos. 1 to 7 (comparative methods), there can be expected to attain an improvement in whiteness of the reclaimed paper, a reduction of residual ink spots in the reclaimed paper and an increase in the recovery of pulp, by the selective removal of ink in flotation.

Example II-2

Deinking test was carried out according to the method described in Example II-1 by using amines shown in Tables II-1 and II-10. The results are shown in Table II-10.

TABLE II-10

| Test No. | Amine Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 26 | None | — | 10.0 | 45.1 | 52.0 | 0.754 | 86.9 |
| 27 | None | — | 7.0 | 45.3 | 54.4 | 0.442 | 88.9 |
| 28 | $a_2$-1 | 0.10 | 7.0 | 45.3 | 57.9 | 0.139 | 92.1 |
| 29 | $a_2$-2 | 0.10 | 7.0 | 45.2 | 57.7 | 0.145 | 92.7 |
| 30 | $a_2$-3 | 0.10 | 7.0 | 45.0 | 57.5 | 0.143 | 92.7 |
| 31 | $a_2$-4 | 0.10 | 7.0 | 45.0 | 56.9 | 0.151 | 93.3 |
| 32 | $a_2$-5 | 0.10 | 7.0 | 45.5 | 57.8 | 0.142 | 92.7 |
| 33 | $a_2$-6 | 0.10 | 7.0 | 45.6 | 57.8 | 0.141 | 92.4 |
| 34 | $a_2$-7 | 0.10 | 7.0 | 45.4 | 57.8 | 0.136 | 92.4 |
| 35 | $a_2$-8 | 0.10 | 7.0 | 45.5 | 57.6 | 0.142 | 92.7 |
| 36 | $a_2$-9 | 0.10 | 7.0 | 45.0 | 57.5 | 0.145 | 92.1 |
| 37 | $a_2$-10 | 0.10 | 7.0 | 45.1 | 57.5 | 0.155 | 93.5 |
| 38 | $a_2$-11 | 0.10 | 7.0 | 45.1 | 57.3 | 0.145 | 93.0 |
| 39 | $a_2$-12 | 0.10 | 7.0 | 45.3 | 57.2 | 0.146 | 92.6 |
| 40 | $a_2$-13 | 0.10 | 7.0 | 45.1 | 57.1 | 0.148 | 92.6 |
| 41 | $a_2$-14 | 0.10 | 7.0 | 44.8 | 56.8 | 0.162 | 93.8 |
| 42 | $a_2$-1/$a_2$-5 | 0.05/0.05 | 7.0 | 45.3 | 57.7 | 0.144 | 92.7 |

According to the methods of Test Nos. 28 to 42 (the methods of the present invention) wherein the flotation is effected in the presence of an amine shown in Table II-1 at a specific pH, as compared with those of Test Nos. 26 and 27 (comparative methods), there can be expected to attain an improvement in whiteness of the reclaimed paper, a reduction of residual ink spots in the reclaimed paper and an increase in the recovery of pulp, by the selective removal of ink in flotation.

Example II-3

Deinking test was carried out according to the method described in Example II-1 by using acid salts of amines shown in Tables II-2 and II-11, optionally together with amine $a_2$-10 shown in Table II-1. The results are shown in Table II-11.

TABLE II-11

| Test No. | Amine and acid salt of amine | | pH in flota-tion | Whiteness (%) | | Residual ink area ratio (%) | reco-very of pulp (%) |
|---|---|---|---|---|---|---|---|
| | Compound No. | Amount added (%) | | Before flotation | After flotation | After flotation | |
| 43 | None | — | 10.0 | 45.1 | 52.1 | 0.749 | 86.8 |
| 44 | None | — | 1.0 | 4s.3 | 54.2 | 0.449 | 88.7 |
| 45 | $b_2$-1 | 0.05 | 7.0 | 45.3 | 57.2 | 0.184 | 92.0 |
| 46 | $b_2$-1 | 0.10 | 7.0 | 45.2 | 57.9 | 0.145 | 92.7 |
| 47 | $b_2$-1 | 0.20 | 7.0 | 45.0 | 58.9 | 0.101 | 93.5 |
| 48 | $b_2$-2 | 0.10 | 7.0 | 45.1 | 57.5 | 0.144 | 92.B |
| 49 | $b_2$-3 | 0.10 | 7.0 | 44.9 | 57.7 | 0.142 | 92.6 |
| 50 | $b_2$-4 | 0.10 | 7.0 | 45.1 | 56.7 | 0.1 57 | 93.4 |
| 51 | $b_2$-5 | 0.10 | 7.0 | 45.4 | 58.0 | 0.132 | 92.6 |
| 52 | $b_2$-6 | 0.10 | 7.0 | 45.5 | 57.6 | 0.138 | 92.3 |
| 53 | $b_2$-7 | 0.10 | 7.0 | 45.3 | 58.0 | 0.135 | 92.2 |
| 54 | $b_2$-8 | 0.10 | 7.0 | 45.4 | 57.4 | 0.143 | 92.8 |
| 55 | $b_2$-9 | 0.10 | 7.0 | 45.1 | 57.7 | 0.138 | 92.6 |
| 56 | $b_2$-10 | 0.10 | 7.0 | 45.0 | 57.3 | 0.145 | 93.3 |
| 57 | $b_2$-11 | 0.10 | 0 | 45.2 | 57.5 | 0.139 | 92.9 |
| 58 | $b_2$-12 | 0.10 | 7.0 | 45.2 | 57.0 | 0.148 | 92.8 |
| 59 | $b_2$-13 | 0.10 | 7.0 | 45.2 | 56.9 | 0.151 | 92.7 |
| 60 | $b_2$-14 | 0.10 | 7.0 | 44.7 | 58.6 | 0.184 | 93.9 |
| 61 | $b_2$-2/ $a_2$-10 | 0.05/0.05 | 7.0 | 45.4 | 57.7 | 0.139 | 92.5 |

According to the methods of Test Nos. 45 to 61 (the methods of the present invention) wherein the flotation is effected in the presence of an acid salt of an amine shown in Table II-2 optionally together with amine $a_2$-10 shown in Table II-1 at a specific pH, as compared with those of Test Nos. 43 and 44 (comparative methods), there can be expected to attain an improvement in whiteness of the reclaimed paper, a reduction of residual ink spots in the reclaimed paper and an increase in the recovery of pulp, by the selective removal of ink in flotation.

Example II-4

Deinking test was carried out according to the method described in Example II-1 by using amines shown in Tables II-3 and II-12. An $EO_{20}$ adduct of stearic acid was used as the deinking agent in the present Example. The results are shown in Table II-12.

TABLE II-12

| Test No. | Amine | | pH in flota-tion | Whiteness (%) | | Residual ink area ratio (%) | Reco-very of pulp (%) |
|---|---|---|---|---|---|---|---|
| | Compound No. | Amount added (%) | | Before flotation | After flotation | After flotation | |
| 62 | None | — | 10.0 | 45.2 | 52.1 | 0.769 | 86.9 |
| 63 | None | — | 7.0 | 45.5 | 54.1 | 0.462 | 88.1 |
| 64 | $c_2$-1 | 0.05 | 7.0 | 45.4 | 57.8 | 0.138 | 92.8 |
| 65 | $c_2$-2 | 0.05 | 7.0 | 44.7 | 56.6 | 0.193 | 93.9 |
| 66 | $c_2$-3 | 0.05 | 7.0 | 45.0 | 58.0 | 0.140 | 92.2 |
| 67 | $c_2$-4 | 0.05 | 7.0 | 45.6 | 58.1 | 0.134 | 92.9 |
| 68 | $c_2$-5 | 0.05 | 7.0 | 45.6 | 58.0 | 0.138 | 92.2 |

According to the methods of Test Nos. 64 to 68 (the methods of the present invention) wherein the flotation is effected in the presence of an amine shown in Table II-3 at a specific pH, as compared with those of Test Nos. 62 and 63 (comparative methods), there can be expected to attain an improvement in whiteness of the reclaimed paper, a reduction of residual ink spots in the reclaimed paper and an increase in the recovery of pulp, by the selective removal of ink in flotation.

Example II-5

Deinking test was carried out according to the method described in Example II-1 by using acid salts of amines shown in Tables II-4 to II-6, and Table II-13. An $EO_{60}$ adduct of a mixture (1:1 by mole) of beef tallow and glycerol was used as the deinking agent in the present Example. The results are shown in Table II-13.

TABLE II-13

| Test No. | Acid salt of amine Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 69 | None | — | 10.0 | 45.0 | 53.1 | 0.709 | 85.9 |
| 70 | None | — | 7.#O | 45.4 | 54.6 | 0.411 | 86.1 |
| 71 | $d_2$-1 | 0.10 | 7.0 | 44.9 | 57.4 | 0.139 | 91.7 |
| 72 | $d_2$-2 | 0.10 | 7.0 | 45.3 | 57.6 | 0.139 | 92.9 |
| 73 | $d_2$-3 | 0.10 | 7.0 | 45.2 | 56.9 | 0.146 | 92.2 |
| 74 | $d_2$-4 | 0.10 | 7.0 | 45.0 | 56.7 | a.156 | 93.5 |
| 75 | $d_2$-5 | 0.10 | 7.0 | 45.1 | 57.0 | 0.147 | 91.7 |
| 76 | $e_2$-1 | 0.10 | 7.0 | 45.1 | 57.4 | 0.140 | 92.2 |
| 77 | $e_2$-2 | 0.10 | 7.0 | 45.2 | 57.6 | 0.144 | 92.7 |
| 78 | $e_2$-3 | 0.10 | 7.0 | 45.4 | 57.2 | 0.153 | 93.3 |
| 79 | $f_2$-1 | 0.10 | 7.0 | 44.8 | 57.3 | 0.148 | 92.4 |
| 80 | $f_2$-2 | 0.10 | 7.0 | 45.2 | 57.4 | 0.145 | 92.8 |
| 81 | $f_2$-3 | 0.10 | 7.0 | 45.5 | 56.7 | 0.159 | 93.3 |

According to the methods of Test Nos. 71 to 81 (the methods of the present invention) wherein the flotation is effected in the presence of an acid salt of an amine shown in Table II-4, II-5 or II-6 at a specific pH, as compared with those of Test Nos. 69 and 70 (comparative methods), there can be expected to attain an improvement in whiteness of the reclaimed paper, a reduction of residual ink spots in the reclaimed paper and an increase in the recovery of pulp, by the selective removal of ink in flotation.

Example II-6

Deinking test was carried out according to the method described in Example II-1 by using amines shown in Tables II-7 and II-8, and Table II-14. The results are shown in Table II-14.

Example II-7

Deinking test was carried out in a similar manner as that In Example I-7 except that the pH of the pulp slurries were each adjusted to a value shown in Table II-15 and that amines and acid salts of amines shown in Tables II-1, II-2 and II-3, and Table II-15 were used instead of the cationic compounds. The results thereof are shown in Table II-15.

TABLE II-14

| Test No. | Amine Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 82 | None | — | 10.0 | 45.0 | 52.0 | 0.752 | 86.6 |
| 83 | None | — | 7.0 | 45.4 | 54.3 | 0.444 | 88.4 |
| 84 | $g_2$-1 | 0.10 | 7.0 | 45.2 | 58.0 | 0.134 | 92.2 |
| 85 | $g_2$-2 | 0.10 | 7.0 | 45.2 | 58.2 | 0.130 | 92.1 |
| 86 | $g_2$-3 | 0 10 | 7.0 | 45.1 | 58.1 | 0.131 | 92.0 |
| 87 | $g_2$-4 | 0.10 | 7.0 | 44.9 | 57.9 | 0.141 | 92.8 |
| 88 | $g_2$-5 | 0.10 | 7.0 | 45.3 | 57.8 | 0.142 | 92.5 |
| 89 | $g_2$-6 | 0.10 | 7.0 | 44.9 | 57.7 | 0.145 | 92.1 |
| 90 | $h_2$-1 | 0.10 | 7.0 | 45.4 | 58.2 | 0.131 | 92.1 |
| 91 | $h_2$-2 | 0.10 | 7.0 | 45.2 | 57.9 | 0.142 | 92.4 |
| 92 | $h_2$-3 | 0.10 | 7.0 | 45.0 | 57.5 | 0.144 | 92.8 |

According to the methods of Test Nos. 84 to 92 (the methods of the present invention) wherein the flotation is effected in the presence of an amine shown in Table II-7 or II-8 at a specific pH, as compared with those of Test Nos. 82 and 83 (comparative methods), there can be expected to attain an improvement in whiteness of the reclaimed paper, a reduction of residual ink spots in the reclaimed paper and

TABLE II-15

| Test No. | Deinking agent No. (See Table I-12) | Amine and acid salt of amine Compd. No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|---|
| 93 | A1 | None | — | 10.0 | 43.9 | 51.0 | 0.841 | 88.5 |
| 94 | A2 | None | — | 10.0 | 44.0 | 52.2 | 0.785 | 86.5 |
| 95 | A3 | None | — | 10.0 | 44.6 | 52.1 | 0.771 | 86.2 |
| 96 | A4 | None | — | 10.0 | 47.8 | 53.5 | 0.415 | 90.0 |
| 97 | A1 | $a_2$-1 | 0.10 | 7.0 | 44.4 | 56.5 | 0.196 | 92.4 |
| 98 | A2 | $a_2$-2 | 0.10 | 7.0 | 44.6 | 57.8 | 0.149 | 91.1 |
| 99 | A3 | $b_2$-6 | 0.10 | 7.0 | 44.8 | 57.4 | 0.157 | 90.4 |
| 100 | A4 | $c_2$-1 | 0.05 | 7.0 | 47.3 | 58.9 | 0.142 | 94.2 |

According to the methods of Test Nos. 97 to 100 (the methods of the present invention) wherein various deinking agents are each used and the flotation is effected in the presence of an amine or an acid salt of an amine at a specific pH, as compared with those of Test Nos. 93 to 96 (comparative methods), there can be expected to attain an improvement in whiteness of the reclaimed paper, a reduction of residual ink spots in the reclaimed paper and an increase in the recovery of pulp.

Example II-8

Deinking test was carried out in a similar manner as that in Example I-8 except that the $Ca^{2+}$ ion concentrations and the pH of the pulp slurries were each adjusted to a value shown in Table II-16 and that amines and acid salts of amines shown in Tables II-1 and II-2, and Table II-16 were used instead of the cationic compounds.

The results thereof are shown in Table II-16.

as compared with those of Test Nos. 101 to 106 (comparative methods), there can be expected to attain an improvement in whiteness of the reclaimed paper, a reduction of residual ink spots in the reclaimed paper and an increase in the recovery of pulp, by the selective removal of ink in flotation.

Example II-9

Deinking test was carried out in a similar manner as that in Example I-9 except that the $Al^{3+}$ ion concentrations, the $Ca^{2+}$ ion concentrations and the pH of the pulp slurries were each adjusted to a value shown in Table II-17 and that amines and acid salts of amines shown in Tables II-1 and II-2, and Table II-17 were used instead of the cationic compounds. For the adjustment of the $Ca^{2+}$ ion concentration, $CaCl_2$ was used, and for the adjustment of $Al^{3+}$ ion concentration, white water resulting from papermaking, or the white water and aluminum sulfate (in Test Nos. 122, 126 and 130) was(were) used. Further, for the adjustment of pH, hydrochloric acid or sodium hydroxide was used.

TABLE II-16

| Test No. | Compound No. | Amount added (%) | pH in flotation | $Ca^{2+}$ ion concentration (ppm) | Whiteness (%) Before flotation | Whiteness (%) After flotation | Residual ink area ratio (%) After flotation | Recovery of pulp (%) |
|---|---|---|---|---|---|---|---|---|
| 101 | None | — | 10.0 | 0 | 44.8 | 52.1 | 0.770 | 86.4 |
| 102 | None | — | 10.0 | 50 | 45.0 | 52.2 | 0.752 | 86.8 |
| 103 | None | — | 10.0 | 100 | 45.3 | 52.5 | 0.743 | 87.3 |
| 104 | None | — | 10.0 | 200 | 45.2 | 52.6 | 0.739 | 87.3 |
| 105 | None | — | 10.0 | 400 | 45.0 | 52.3 | 0.765 | 87.6 |
| 106 | None | — | 10.0 | 800 | 44.7 | 51.8 | 0.781 | 87.6 |
| 107 | $a_2$-1 | 0.10 | 7.0 | 0 | 45.3 | 57.7 | 0.144 | 92.9 |
| 108 | $a_2$-1 | 0.10 | 7.0 | 50 | 45.5 | 58.0 | 0.126 | 92.3 |
| 109 | $a_2$-1 | 0.10 | 7.0 | 100 | 45.8 | 58.8 | 0.071 | 92.1 |
| 110 | $a_2$-1 | 0.10 | 7.0 | 200 | 45.9 | 59.6 | 0.065 | 92.3 |
| 111 | $a_2$-1 | 0.10 | 7.0 | 400 | 45.6 | 58.1 | 0.106 | 93.2 |
| 112 | $a_2$-1 | 0.10 | 7.0 | 800 | 45.4 | 57.2 | 0.178 | 94.1 |
| 113 | $a_2$-2 | 0.06 | 7.0 | 0 | 44.9 | 57.6 | 0.147 | 93.2 |
| 114 | $a_2$-2 | 0.06 | 7.0 | 200 | 45.4 | 59.5 | 0.066 | 92.6 |
| 115 | $a_2$-2 | 0.06 | 7.0 | 800 | 44.9 | 57.2 | 0.181 | 93.8 |
| 116 | $b_2$-6 | 0.03 | 7.0 | 0 | 44.8 | 57.3 | 0.149 | 91.4 |
| 117 | $b_2$-6 | 0.03 | 7.0 | 200 | 45.2 | 59.1 | 0.075 | 90.8 |
| 118 | $b_2$-6 | 0.03 | 7.0 | 800 | 44.8 | 56.8 | 0.189 | 92.6 |

Note) The $Ca^{2+}$ ion concentrations in the above Table were determined in flotation.

According to the methods of Test Nos. 107 to 118 (the methods of the present invention) wherein the flotation is effected in the presence of an amine or an acid salt of an amine at a specific pH at a specific $Ca^{2+}$ ion concentration, The results thereof are shown in Table II-17.

TABLE II-17

| Test No. | Amine and acid salt of amine Compd. No. | Amount added (%) | pH in flotation | $Al^{3+}$ ion conc. (ppm) | $Ca^{2+}$ ion conc. (ppm) | Whiteness (%) Before flotation | Whiteness (%) After flotation | Residual ink area ratio (%) After flotation | Recovery of pulp (%) |
|---|---|---|---|---|---|---|---|---|---|
| 119 | None | — | 10.0 | 0 | 100 | 45.3 | 52.5 | 0.743 | 87.3 |
| 120 | None | — | 10.0 | 20 | 100 | 45.5 | 52.2 | 0.776 | 85.2 |
| 121 | None | — | 10.0 | 40 | 100 | 44.4 | 51.9 | 0.802 | 82.7 |
| 122 | None | — | 10.0 | 60 | 100 | 43.4 | 51.7 | 0.822 | 79.3 |
| 123 | $a_2$-1 | 0.10 | 7.0 | 0 | 100 | 45.8 | 58.8 | 0.071 | 92.1 |
| 124 | $a_2$-1 | 0.10 | 7.0 | 20 | 100 | 45.9 | 58.0 | 0.106 | 90.2 |
| 125 | $a_2$-1 | 0.10 | 7.0 | 40 | 100 | 45.2 | 56.7 | 0.212 | 87.7 |
| 126 | $a_2$-1 | 0.10 | 7.0 | 60 | 100 | 44.1 | 54.0 | 0.387 | 84.3 |
| 127 | $a_2$-2 | 0.06 | 7.0 | 20 | 100 | 45.4 | 57.7 | 0.107 | 90.6 |
| 128 | $a_2$-2 | 0.06 | 7.0 | 60 | 100 | 43.9 | 53.8 | 0.489 | 84.5 |
| 129 | $b_2$-6 | 0.03 | 7.0 | 20 | 100 | 45.1 | 57.3 | 0.116 | 88.6 |
| 130 | $b_2$-6 | 0.03 | 7.0 | 60 | 100 | 43.5 | 53.6 | n.505 | 82.9 |

Note) The $Al^{3+}$ ion concentrations and the $Ca^{2+}$ ion concentrations in the above Table were determined in flotation.

According to the methods of Test Nos. 123 to 130 (the methods of the present invention) wherein the flotation is effected in the presence of an amine or an acid salt of an amine at a specific pH at a specific $Ca^{2+}$ ion concentration, as compared with those of Test Nos. 119 to 122 (comparative methods), an improvement in whiteness of the reclaimed paper, a reduction of residual ink spots in the reclaimed paper and an increase in the recovery of pulp there can be attained. Further, when $Al^{3+}$ ion concentration of the slurry in flotation is 40 ppm or less, it can be expected to obtain qualities superior thereto.

Example II-10

Waste papers (news papers/leaflets=75/25) recovered in a city were treated according to the following deinking methods, and the performances of the pulp sheet thus obtained were evaluated in the same manner as that in Example I-1. The results thereof are shown in Table II-18.

In this Example, the $Ca^{2+}$ ion concentration of the warm water had been adjusted with $CaCl_2$, while the $Al^{3+}$ ion concentration thereof had been adjusted with white water resulting from paper-making.

(1) Test Nos. 131 and 132

The pulp sheet were prepared in a similar manner as that in Example I-10-(1) except that the $Al^{3+}$ ion concentrations, the $Ca^{2+}$ ion concentrations and the pH of the pulp slurries were each adjusted to a value shown in Table II-18.

(2) Test Nos. 133 and 134

The pulp sheet were prepared in a similar manner as that in Example I-10-(2) except that the $Al^{3+}$ ion concentrations, the $Ca^{2+}$ ion concentrations and the pH of the pulp slurries were each adjusted to a value shown in Table II-18. In Test No. 133, aluminum sulfate was also added to the pulp slurry to adjust the $Al^{3+}$ concentration of the slurry to a value shown in Table II-18.

(3) Test Nos. 135 and 136

The pulp sheet were prepared in a similar manner as that in Example I-10-(3) except that the $Al^{3+}$ ion concentrations, the $Ca^{2+}$ ion concentrations and the pH of the pulp slurries were each adjusted to a value shown in Table II-18 and that 0.1% by weight (based on the waste papers) of amine $a_2$-1 shown in Table II-1 or acid salt of amine $b_2$-5 shown in Table II-2 was used instead of the cationic compound.

TABLE II-18

| Test No. | Nonionic compound, amine or acid salt of amine Name or number of compound | pH in flotation | $Al^{3+}$ ion conc. (ppm) | $Ca^{2+}$ ion conc. (ppm) | Whiteness (%) Before flotation | Whiteness (%) After flotation | Residual ink area ratio (%) After flotation | Recovery of pulp (%) |
|---|---|---|---|---|---|---|---|---|
| 131 | None | 4.5 | 30 | 5 | 42.2 | 52.9 | 0.683 | 87.8 |
| 132 | None | 7.0 | 15 | 200 | 42.1 | 52.8 | 0.690 | 87.1 |
| 133 | NP-800 | 4.5 | 60 | 5 | 44.4 | 53.6 | 0.409 | 77.6 |
| 134 | NP-800 | 7.0 | 15 | 200 | 44.6 | 53.4 | 0.418 | 78.2 |
| 135 | $a_2$-1 | 7.0 | 15 | 200 | 45.5 | 58.8 | 0.106 | 91.3 |
| 136 | $b_2$-5 | 7.0 | 15 | 200 | 45.4 | 58.9 | 0.112 | 91.6 |

Note) The $Al^{3+}$ ion concentrations and the $Ca^{2+}$ ion concentrations in the above Table were determined in flotation.

It is observed in Test Nos. 131 and 132 (comparative examples) that a lot of non-liberated ink spots which have not been removed from pulp by flotation is present in the reclaimed paper since the deinking agent having a poor power for liberating ink is used in the disintegrating step of waste papers. Accordingly, the reclaimed pulp is poor in quality. In Test Nos. 133 and 134 (comparative examples), the addition of the polyacrylamide optionally with aluminum sulfate causes the re-adhesion of ink to cellulose fibers, and reduces the quality of the reclaimed pulp. Further, it is observed that foaming in flotation is extremely enhanced to deteriorate the recovery of pulp.

In contrast, according to the methods of Test Nos. 134 and 135 (the methods of the present invention) wherein the flotation Is effected in the presence of an amine or an acid salt of an amine at a specific pH at a specific $Ca^{2+}$ ion concentration and at a specific $Al^{3+}$ ion concentration, an improvement in whiteness of the reclaimed paper, a reduction of residual ink spots in the reclaimed paper and an increase in the recovery of pulp are observed.

Example II-11

Deinking test was carried out according to the method described in Example II-1 by using an acid salt of an amine represented by the following formula:

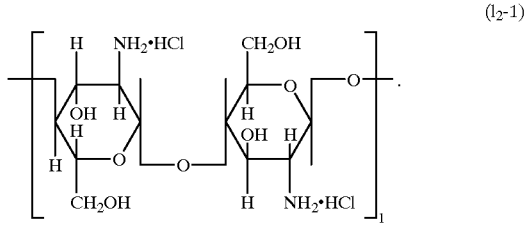

($I_2$-1)

The results are shown in Table II-19.

<Amphoteric Compounds>

The amphoteric compounds used in the following Examples III-1 to III-16 will be shown in the following Tables III-1 to III-12.

In Tables III-1 to III-12, each numeral in the columns of $R_1$ to $R_4$ means the carbon atom number of a linear alkyl group as a substituent; and "18 F1", "18 Hyd" and "12 Hyd" refer oleyl group, β-hydroxystearyl group and β-hydroxylauryl group, respectively.

TABLE III-1

| General formula | Compound No. | Substituent | | |
|---|---|---|---|---|
| | | $R_1$ | $R_2$ | $R_3$ |
| $R_2\!-\!\!\!\underset{R_3}{\overset{R_1}{N}}\!\!\rightarrow\!O$ | $a_3$-1 | 12 | 1 | 1 |
| | $a_3$-2 | 18 | 18 | 1 |
| | $a_3$-3 | 18 | 2 | 2 |
| | $a_3$-4 | 18 F1 | 8 | 1 |
| | $a_3$-5 | 22 | 12 | 12 |

TABLE II-19

| | | Polymer | | | | | Residual ink area ratio | |
|---|---|---|---|---|---|---|---|---|
| Test No. | Compd. No. | Content of derived from amino groups* (%) | weight-average molecular weight | Amount added (%) | pH in flotation | Whiteness (%) Before flotation | Whiteness (%) After flotation | (%) After flotation | Recovery of pulp (%) |
| 137 | None | — | — | — | 10.0 | 45.0 | 52.2 | 0.752 | 86.8 |
| 138 | None | — | — | — | 9.0 | 45.4 | 52.8 | 0.683 | 87.2 |
| 139 | None | — | — | — | 8.0 | 44.9 | 53.3 | 0.411 | 88.3 |
| 140 | None | — | — | — | 7.0 | 45.6 | 53.6 | 0.365 | 88.9 |
| 141 | None | — | — | — | 6.0 | 45.0 | 54.0 | 0.329 | 88.9 |
| 142 | None | — | — | — | 5.0 | 44.6 | 53.1 | 0.431 | 89.1 |
| 143 | None | — | — | — | 4.0 | 44.3 | 52.9 | 0.625 | 87.6 |
| 144 | $I_2$-1 | 6.40 | 300,000 | 0.01 | 9.0 | 45.3 | 54.6 | 0.302 | 88.9 |
| 145 | $I_2$-1 | 6.40 | 300,000 | 0.01 | 8.0 | 44.8 | 56.8 | 0.178 | 90.7 |
| 146 | $I_2$-1 | 6.40 | 300,000 | 0.01 | 7.0 | 45.0 | 57.0 | 0.165 | 92.8 |
| 147 | $I_2$-1 | 6.40 | 300,000 | 0.01 | 6.0 | 44.9 | 56.7 | 0.192 | 92.0 |
| 148 | $I_2$-1 | 6.40 | 300,000 | 0.01 | 5.0 | 44.7 | 56.1 | 0.248 | 91.5 |
| 149 | $I_2$-1 | 6.40 | 300,000 | 0.01 | 4.0 | 44.6 | 55.8 | 0.286 | 90.3 |

Note) *: The content (%) of nitrogen derived from amino groups was calculated by multiplying the nitrogen content (%) determined by Kjeldahl method by the ratio of the nitrogen derived from amino groups to the total nitrogen which was determined from the molecular formula of the polymer.

In the tests described above, Test No. 137 is effected in a similar manner as that of a conventional industrial deinking method. According to the methods of Test Nos. 144 to 149 (the methods of the present invention) wherein the flotation is effected in the presence of an amine or an acid salt of an amine at a specific pH, as compared with those of Test Nos. 137 to 143 (comparative methods), there can be expected to attain an improvement in whiteness of the reclaimed paper, a reduction of residual ink spots in the reclaimed paper and an increase in the recovery of pulp, by the selective removal of ink in flotation.

TABLE III-2

| General formula | Compound No. | Substituent | | |
|---|---|---|---|---|
| | | $R_1$ | $R_2$ | $R_3$ |
| $R_2\!-\!\!\!\underset{R_3}{\overset{R_1}{N^+}}\!\!CH_2COO^-$ | $b_3$-1 | 12 | 1 | 1 |
| | $b_3$-2 | 18 | 18 | 1 |
| | $b_3$-3 | 18 | 2 | 2 |
| | $b_3$-4 | 18 F1 | 8 | 1 |
| | $b_3$-5 | 22 | 12 | 12 |

TABLE III-3

| General formula | Compound No. | Substituent $R_5$ in $Y_1$ | $R_5$ in $Y_2$ | M |
|---|---|---|---|---|
| $Y_1$<br>$\diagdown$<br>$NCH_2COOM$<br>$\diagup$<br>$Y_2$ | $c_3$-1<br>$c_3$-2<br>$c_3$-3 | 12<br>18<br>18 Fl | 18<br>H<br>1 | H<br>Na<br>$NH_4$ |

TABLE III-4

| General formula | Compound No. | Substituent $R_4$ | M |
|---|---|---|---|
| $R_4CONHCH_2CH_2N$⟨$CH_2COOM$ / $CH_2COOM$ | $d_3$-1<br>$d_3$-2<br>$d_3$-3<br>$d_3$-4<br>$d_3$-5 | 12<br>18<br>22<br>18 Fl<br>18 Hyd | Na<br>Na<br>$NH_4$<br>Na<br>Na |

TABLE III-5

| General formula | Compound No. | Substituent $R_4$ | M |
|---|---|---|---|
| $R_4N$—$CH_2COOM$ / $CH_2COOM$ / $CH_2COO^-$ | $e_3$-1<br>$e_3$-2<br>$e_3$-3<br>$e_3$-4<br>$e_3$-5 | 12<br>18<br>22<br>18 Fl<br>18 Hyd | Na<br>Na<br>$NH_4$<br>Na<br>Na |

TABLE III-6

| General formula | Compound No. | Substituent $R_4$ | $Z_1$ | $Z_2$ |
|---|---|---|---|---|
| $R_4N$⟨$Z_1$ / $Z_2$ | $f_3$-1<br>$f_3$-2<br>$f_3$-4<br>$f_3$-5 | 12<br>18<br>22<br>18 Fl<br>18 Hyd | $CH_2COONa$<br>$CH_2COOH$<br>$CH_2COOH$<br>$CH_2COOH$<br>$CH_2COOH$ | $CH_2COONa$<br>H<br>$CH_2COOH$<br>H<br>H |

TABLE III-7

| General formula | Compound No. | Substituent $R_4$ | M |
|---|---|---|---|
| $R_4NHCH_2CH_2COOM$ | $g_3$-1<br>$g_3$-2<br>$g_3$-3<br>$g_3$-4<br>$g_3$-5 | 12<br>18<br>22<br>18 Fl<br>18 Hyd | Na<br>Na<br>$NH_4$<br>Na<br>Na |

TABLE III-8

| General formula | Compound No. | Substituent $R_4$ | M |
|---|---|---|---|
| $R_4NH(CH_2)_5COOM$ | $h_3$-1<br>$h_3$-2<br>$h_3$-3 | 12<br>18<br>22 | Na<br>Na<br>$NH_4$ |

TABLE III-8-continued

| General formula | Compound No. | Substituent $R_4$ | M |
|---|---|---|---|
| | $h_3$-4<br>$h_3$-5 | 18 Fl<br>18 Hyd | Na<br>Na |

TABLE III-9

| General formula | Compound No. | Substituent $R_1$ | $R_2$ | $R_3$ |
|---|---|---|---|---|
| $R_1$<br>$R_2$—$N^+$—$CHCOO^-$<br>$R_3$ $CH_2COOH$ | $i_3$-1<br>$i_3$-2<br>$i_3$-3<br>$i_3$-4<br>$i_3$-5 | 12<br>18<br>18<br>18 Fl<br>22 | 1<br>18<br>2<br>8<br>12 | 1<br>1<br>2<br>1<br>12 |

TABLE III-10

| General formula | Compound No. | Substituent $R_4$ |
|---|---|---|
| $R_4$—$C$⟨N—$CH_2$ / $N^+$—$CH_2$⟩ $CH_2COO^-$ $CH_2CH_2OH$ | $j_3$-1<br>$j_3$-2<br>$j_3$-3<br>$j_3$-4<br>$j_3$-5 | 12<br>18<br>22<br>18 Fl<br>18 Hyd |

TABLE III-11

| | Compound No. | Kind of compound |
|---|---|---|
| Phospholipid | $k_3$-1<br>$k_3$-2<br>$k_3$-3 | Soybean lecithin<br>Phosphatidyl choline derived from egg<br>Phosphatidyl ethanolamine derived from soybean |

TABLE III-12

| | Compound No. | Kind of compound |
|---|---|---|
| Protein | $l_3$-1<br>$l_3$-2<br>$l_3$-3 | Soybean protein<br>Casein<br>Lactalbumin |

Example III-1

Deinking test was carried out in a similar manner as that in Example I-1 except that the pH of the pulp slurries were each adjusted to a value shown in Table III-13 and that amphoteric compounds shown in Tables III-1, III-2 and III-3, and Table III-13 were used instead of the cationic compounds. By the addition of the amphoteric compound, the pH of the slurry was scarcely altered (the same will be applied to the following Examples III-2 to III-16).

The results thereof are shown in Table III-13.

TABLE III-13

| Test No. | Amphoteric compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 1 | None | — | 10.0 | 45.0 | 52.2 | 0.752 | 86.8 |
| 2 | None | — | 9.0 | 45.4 | 52.8 | 0.683 | 87.2 |
| 3 | None | — | 8.0 | 44.9 | 53.3 | 0.411 | 88.3 |
| 4 | None | — | 7.0 | 45.6 | 53.6 | 0.365 | 88.9 |
| 5 | None | — | 6.0 | 45.0 | 54.0 | 0.329 | 88.9 |
| 6 | None | — | 5.0 | 44.6 | 53.1 | 0.431 | 89.1 |
| 7 | None | — | 4.0 | 44.3 | 52.9 | 0.625 | 87.6 |
| 8 | $a_3$-1 | 0.06 | 9.0 | 45.0 | 56.2 | 0.258 | 89.0 |
| 9 | $a_3$-1 | 0.06 | 8.0 | 44.9 | 57.9 | 0.157 | 89.0 |
| 10 | $a_3$-1 | 0.06 | 7.0 | 44.9 | 57.7 | 0.155 | 93.0 |
| 11 | $a_3$-1 | 0.06 | 6.0 | 44.9 | 57.3 | 0.186 | 92.3 |
| 12 | $a_3$-1 | 0.06 | 5.0 | 44.9 | 57.1 | 0.226 | 92.7 |
| 13 | $a_3$-1 | 0.06 | 4.0 | 44.8 | 56.5 | 0.246 | 91.2 |
| 14 | $b_3$-1 | 0.06 | 9.0 | 45.0 | 56.3 | 0.253 | 88.9 |
| 15 | $b_3$-1 | 0.06 | 8.0 | 45.0 | 57.2 | 0.152 | 88.7 |
| 16 | $b_3$-1 | 0.06 | 7.0 | 44.9 | 56.9 | 0.151 | 92.8 |
| 17 | $b_3$-1 | 0.06 | 6.0 | 44.9 | 56.6 | 0.172 | 92.3 |
| 18 | $b_3$-1 | 0.06 | 5.0 | 44.8 | 56.5 | 0.220 | 92.3 |
| 19 | $b_3$-1 | 0.06 | 4.0 | 44.8 | 56.4 | 0.248 | 91.2 |
| 20 | $c_3$-2 | 0.06 | 9.0 | 45.1 | 55.9 | 0.239 | 87.7 |
| 21 | $c_3$-2 | 0.06 | 8.0 | 45.0 | 57.0 | 0.150 | 87.2 |
| 22 | $c_3$-2 | 0.06 | 7.0 | 44.9 | 57.2 | 0.144 | 91.3 |
| 23 | $c_3$-2 | 0.06 | 6.0 | 44.9 | 57.4 | 0.141 | 90.7 |
| 24 | $c_3$-2 | 0.06 | 5.0 | 44.7 | 57.3 | 0.150 | 91.1 |
| 25 | $c_3$-2 | 0.06 | 4.0 | 44.5 | 56.7 | 0.216 | 89.7 |

Note) The amount of the amphoteric compound is expressed by % by weight based on the waste papers (i.e., the absoluted dry weight of the waste papers). The same will be applied to the following Examples III-2 to III-16.

In the tests described above, Test No. 1 is effected in a similar manner as that of a conventional industrial deinking method. According to the methods of Test Nos. 8 to 25 (the methods of the present invention) wherein the flotation is effected in the presence of an amphoteric compound at a specific pH, as compared with those of Test Nos. 1 to 7 (comparative methods), there can be expected to attain an improvement in whiteness of the reclaimed paper, a reduction of residual ink spots in the reclaimed paper and an increase in the recovery of pulp, by the selective removal of ink in flotation.

Example III-2

Deinking test was carried out according to the method described in Example III-1 by using amphoteric compounds shown in Tables III-1 and III-14. The results are shown in Table III-14.

TABLE III-14

| Test No. | Amphoteric compound Compound No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 26 | None | — | 10.0 | 45.2 | 52.1 | 0.769 | 86.8 |
| 27 | None | — | 7.0 | 45.4 | 54.5 | 0.429 | 88.7 |
| 28 | $a_3$-1 | 0.10 | 7.0 | 44.9 | 58.1 | 0.135 | 91.9 |
| 29 | $a_3$-2 | 0.10 | 7.0 | 45.0 | 57.4 | 0.146 | 93.7 |
| 30 | $a_3$-3 | 0.10 | 7.0 | 45.2 | 57.6 | 0.138 | 92.6 |
| 31 | $a_3$-4 | 0.10 | 7.0 | 44.6 | 57.2 | 0.155 | 93.5 |
| 32 | $a_3$-5 | 0.10 | 7.0 | 45.2 | 57.1 | 0.159 | 93.4 |

According to the methods of Test Nos. 28 to 32 (the methods of the present invention) wherein the flotation is effected in the presence of an amphoteric compound shown in Table III-1 at a specific pH, as compared with those of Test Nos. 26 and 27 (comparative methods), there can be expected to attain an improvement in whiteness of the reclaimed paper, a reduction of residual ink spots in the reclaimed paper and an increase in the recovery of pulp.

Example III-3

Deinking test was carried out according to the method described in Example III-1 by using amphoteric compounds shown in Tables III-2 and III-15. The results are shown in Table III-15.

TABLE III-15

| Test No. | Amphoteric compound Compound No. | Amphoteric compound Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 33 | None | — | 10.0 | 45.1 | 52.3 | 0.757 | 86.6 |
| 34 | None | — | 7.0 | 45.4 | 54.4 | 0.434 | 88.8 |
| 35 | $b_3$-1 | 0.10 | 7.0 | 45.1 | 58.0 | 0.136 | 91.8 |
| 36 | $b_3$-2 | 0.10 | 7.0 | 45.1 | 57.5 | 0.145 | 93.4 |
| 37 | $b_3$-3 | 0.10 | 7.0 | 45.0 | 57.5 | 0.146 | 92.4 |
| 38 | $b_3$-4 | 0.10 | 7.0 | 44.9 | 57.1 | 0.152 | 93.5 |
| 39 | $b_3$-5 | 0.10 | 7.0 | 45.2 | 57.1 | 0.155 | 93.6 |

According to the methods of Test Nos. 35 to 39 (the methods of the present invention) wherein the flotation is effected in the presence of an amphoteric compound shown in Table III-2 at a specific pH, as compared with those of Test Nos. 33 and 34 (comparative methods), there can be expected to attain an improvement in whiteness of the reclaimed paper, a reduction of residual ink spots in the reclaimed paper and an increase in the recovery of pulp.

Example III-4

Deinking test was carried out according to the method described in Example III-1 by using amphoteric compounds shown in Tables III-3 and III-16. An $EO_{20}$ adduct of stearic acid was used as the deinking agent in the present Example. The results are shown in Table III-16.

TABLE III-16

| Test No. | Amphoteric compound Compound No. | Amphoteric compound Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 40 | None | — | 10.0 | 45.1 | 52.1 | 0.767 | 86.6 |
| 41 | None | — | 7.0 | 45.3 | 54.3 | 0.436 | 88.7 |
| 42 | $c_3$-1 | 0.10 | 7.0 | 45.4 | 57.4 | 0.144 | 92.2 |
| 43 | $c_3$-2 | 0.10 | 7.0 | 45.3 | 58.0 | 0.136 | 91.9 |
| 44 | $c_3$-5 | 0.10 | 7.0 | 45.4 | 57.8 | 0.140 | 92.1 |

According to the methods of Test Nos. 42 to 44 (the methods of the present invention) wherein the flotation is effected in the presence of an amphoteric compound shown in Table III-3 at a specific pH, as compared with those of Test Nos. 40 and 41 comparative methods), there can be expected to attain an improvement in whiteness of the reclaimed paper, a reduction of residual ink spots in the reclaimed paper and an increase in the recovery of pulp.

Example III-5

Deinking test was carried out according to the method described in Example III-1 by using amphoteric compounds shown in Table III-4 and III-17. An $EO_{60}$ adduct of a mixture (1:1 by mole) of beef tallow and glycerol was used as the deinking agent in the present Example. The results are shown in Table III-17.

TABLE III-17

| Test No. | Amphoteric compound Compound No. | Amphoteric compound Amount added (%) | pH in flotation | Whiteness (%) Before flotation | Whiteness (%) After flotation | Residual ink area ratio (%) After flotation | Recovery of pulp (%) |
|---|---|---|---|---|---|---|---|
| 45 | None | — | 10.0 | 45.2 | 52.3 | 0.755 | 86.5 |
| 46 | None | — | 7.0 | 45.2 | 54.1 | 0.441 | 88.6 |
| 47 | $d_3$-1 | 0.10 | 7.0 | 45.2 | 58.0 | 0.137 | 91.5 |
| 48 | $d_3$-2 | 0.10 | 7.0 | 45.1 | 57.4 | 0.145 | 91.8 |
| 49 | $d_3$-3 | 0.10 | 7.0 | 45.3 | 57.3 | 0.151 | 92.2 |
| 50 | $d_3$-4 | 0.10 | 7.0 | 44.9 | 57.1 | 0.158 | 92.1 |
| 51 | $d_3$-5 | 0.10 | 7.0 | 45.1 | 57.5 | 0.140 | 92.6 |

According to the methods of Test Nos. 47 to 51 (the methods of the present invention) wherein the flotation is effected in the presence of an amphoteric compound shown in Table III-4 at a specific pH, as compared with those of Test Nos. 45 and 46 (comparative methods), there can be expected to attain an improvement in whiteness of the reclaimed paper, a reduction of residual ink spots in the reclaimed paper and an increase in the recovery of pulp.

Example III-6

Deinking test was carried out according to the method described in Example III-1 by using amphoteric compounds shown in Tables III-5 and III-18. The results are shown in Table III-18.

TABLE III-18

| Test No. | Amphoteric compound | | pH in flotation | Whiteness (%) | | Residual ink area ratio (%) | Recovery of pulp (%) |
|---|---|---|---|---|---|---|---|
| | Compound No. | Amount added (%) | | Before flotation | After flotation | After flotation | |
| 52 | None | — | 10.0 | 45.3 | 52.1 | 0.760 | 86.5 |
| 53 | None | — | 7.0 | 45.2 | 54.3 | 0.433 | 89.0 |
| 54 | $e_3$-1 | 0.10 | 7.0 | 45.3 | 57.7 | 0.144 | 91.4 |
| 55 | $e_3$-2 | 0.10 | 7.0 | 45.3 | 57.5 | 0.145 | 92.0 |
| 56 | $e_3$-3 | 0.10 | 7.0 | 45.2 | 57.6 | 0.146 | 92.1 |
| 57 | $e_3$-4 | 0.10 | 7.0 | 45.2 | 57.4 | 0.147 | 92.5 |
| 58 | $e_3$-5 | 0.10 | 7.0 | 45.2 | 57.4 | 0.146 | 92.6 |

According to the methods of Test Nos. 54 to 58 (the methods of the present invention) wherein the flotation is effected in the presence of an amphoteric compound shown in Table III-5 at a specific pH, as compared with those of Test Nos. 52 and 53 (comparative methods), there can be expected to attain an improvement in whiteness of the reclaimed paper, a reduction of residual ink spots in the reclaimed paper and an increase in the recovery of pulp.

Example III-7

Deinking test was carried out according to the method described in Example III-1 by using amphoteric compounds shown in Tables III-6 and III-19. The results are shown in Table III-19.

TABLE III-19

| Test No. | Amphoteric compound | | pH in flotation | Whiteness (%) | | Residual ink area ratio (%) | Recovery of pulp (%) |
|---|---|---|---|---|---|---|---|
| | Compound No. | Amount added (%) | | Before flotation | After flotation | After flotation | |
| 59 | None | — | 10.0 | 45.2 | 52.1 | 0.761 | 86.5 |
| 60 | None | — | 7.0 | 45.3 | 54.4 | 0.439 | 88.7 |
| 61 | $f_3$-1 | 0.10 | 7.0 | 45.2 | 57.6 | 0.145 | 91.7 |
| 62 | $f_3$-2 | 0.10 | 7.0 | 45.2 | 57.3 | 0.148 | 92.2 |
| 63 | $f_3$-3 | 0.10 | 7.0 | 45.3 | 57.5 | 0.146 | 92.3 |
| 64 | $f_3$-4 | 0.10 | 7.0 | 45.1 | 57.6 | 0.147 | 92.1 |
| 65 | $f_3$-5 | 0.10 | 7.0 | 45.2 | 57.5 | 0.147 | 92.4 |

According to the methods of Test Nos. 61 to 65 (the methods of the present invention) wherein the flotation is effected in the presence of an amphoteric compound shown in Table III-6 at a specific pH, as compared with those of Test Nos. 59 and 60 (comparative methods), there can be expected to attain an improvement in whiteness of the reclaimed paper, a reduction of residual ink spots in the reclaimed paper and an increase in the recovery of pulp.

Example III-8

Deinking test was carried out according to the method described in Example III-1 by using amphoteric compounds shown in Tables III-7 and III-20. The results are shown in Table III-20.

TABLE III-20

| Test No. | Amphoteric compound Compound No. | Amphoteric compound Amount added (%) | pH in flota- tion | Whiteness (%) Before flotation | Whiteness (%) After flotation | Residual ink area ratio (%) After flotation | Reco- very of pulp (%) |
|---|---|---|---|---|---|---|---|
| 66 | None | — | 10.0 | 45.1 | 52.1 | 0.754 | 86.5 |
| 67 | None | — | 7.0 | 45.3 | 54.2 | 0.439 | 88.9 |
| 68 | $g_3$-1 | 0.10 | 7.0 | 45.2 | 57.8 | 0.137 | 92.3 |
| 69 | $g_3$-2 | 0.10 | 7.0 | 45.2 | 57.7 | 0.145 | 92.9 |
| 70 | $g_3$-3 | 0.10 | 7.0 | 45.3 | 57.5 | 0.147 | 93.1 |
| 71 | $g_3$-4 | 0.10 | 7.0 | 45.0 | 57.3 | 0.156 | 93.4 |
| 72 | $g_3$-5 | 0.10 | 7.0 | 45.1 | 57.5 | 0.150 | 93.1 |

According to the methods of Test Nos. 68 to 72 (the methods of the present invention) wherein the flotation is effected in the presence of an amphoteric compound shown in Table III-7 at a specific pH, as compared with those of Test Nos. 66 and 67 (comparative methods), there can be expected to attain an improvement in whiteness of the reclaimed paper, a reduction of residual ink spots in the reclaimed paper and an increase in the recovery of pulp.

Example III-9

Deinking test was carried out according to the method described in Example III-1 by using amphoteric compounds shown in Tables III-8 and III-21. The results are shown in Table III-21.

TABLE III-21

| Test No. | Amphoteric compound Compound No. | Amphoteric compound Amount added (%) | pH in flota- tion | Whiteness (%) Before flotation | Whiteness (%) After flotation | Residual ink area ratio (%) After flotation | Reco- very of pulp (%) |
|---|---|---|---|---|---|---|---|
| 73 | None | — | 10.0 | 45.1 | 52.2 | 0.759 | 86.7 |
| 74 | None | — | 7.0 | 45.4 | 54.4 | 0.435 | 88.7 |
| 75 | $h_3$-1 | 0.10 | 7.0 | 45.1 | 57.6 | 0.146 | 92.2 |
| 76 | $h_3$-2 | 0.10 | 7.0 | 45.1 | 57.5 | 0.144 | 92.3 |
| 77 | $h_3$-3 | 0.10 | 7.0 | 45.1 | 57.4 | 0.146 | 92.8 |
| 78 | $h_3$-4 | 0.10 | 7.0 | 45.2 | 57.1 | 0.162 | 93.1 |
| 79 | $h_3$-5 | 0.10 | 7.0 | 45.0 | 57.5 | 0.145 | 92.4 |

According to the methods of Test Nos. 75 to 79 (the methods of the present invention) wherein the flotation is effected in the presence of an amphoteric compound shown in Table III-8 at a specific pH, as compared with those of Test Nos. 73 and 74 (comparative methods), there can be expected to attain an improvement in whiteness of the reclaimed paper, a reduction of residual ink spots in the reclaimed paper and an increase in the recovery of pulp.

Example III-10

Deinking test was carried out according to the method described in Example III-1 by using amphoteric compounds shown in Tables III-9 and III-22. The results are shown in Table III-22.

TABLE III-22

| Test No. | Amphoteric compound Compound No. | Amphoteric compound Amount added (%) | pH in flota- tion | Whiteness (%) Before flotation | Whiteness (%) After flotation | Residual ink area ratio (%) After flotation | Reco- very of pulp (%) |
|---|---|---|---|---|---|---|---|
| 80 | None | — | 10.0 | 45.2 | 52.2 | 0.766 | 86.7 |
| 81 | None | — | 7.0 | 45.1 | 54.4 | 0.435 | 88.7 |
| 82 | $i_3$-1 | 0.10 | 7.0 | 45.2 | 57.7 | 0.141 | 91.8 |
| 83 | $i_3$-2 | 0.10 | 7.0 | 45.1 | 57.4 | 0.147 | 92.4 |
| 84 | $i_3$-3 | 0.10 | 7.0 | 45.0 | 57.4 | 0.146 | 92.5 |
| 85 | $i_3$-4 | 0.10 | 7.0 | 45.1 | 57.6 | 0.143 | 92.6 |
| 86 | $i_3$-5 | 0.10 | 7.0 | 45.4 | 57.6 | 0.142 | 92.1 |

According to the methods of Test Nos. 82 to 86 (the methods of the present invention) wherein the flotation is effected in the presence of an amphoteric compound shown in Table III-9 at a specific pH, as compared with those of Test Nos. 80 and 81 (comparative methods), there can be expected to attain an improvement in whiteness of the reclaimed paper, a reduction of residual ink spots in the reclaimed paper and an increase in the recovery of pulp.

Example III-11

Deinking test was carried out according to the method described in Example III-1 by using amphoteric compounds shown in Tables III-10 and IIII-23. The results are shown in Table III-23.

TABLE III-23

| | Amphoteric compound | | | Whiteness (%) | | Residual ink area ratio (%) | |
|---|---|---|---|---|---|---|---|
| Test No. | Compound No. | Amount added (%) | pH in flotation | Before flotation | After flotation | After flotation | Recovery of pulp (%) |
| 87 | None | — | 10.0 | 45.2 | 52.4 | 0.754 | 86.7 |
| 88 | None | — | 7.0 | 45.2 | 54.3 | 0.440 | 88.6 |
| 89 | $j_3$-1 | 0.10 | 7.0 | 45.2 | 57.6 | 0.142 | 92.3 |
| 90 | $j_3$-2 | 0.10 | 7.0 | 45.3 | 57.4 | 0.150 | 92.4 |
| 91 | $j_3$-3 | 0.10 | 7.0 | 45.1 | 57.3 | 0.153 | 92.2 |
| 92 | $j_3$-4 | 0.10 | 7.0 | 45.0 | 57.6 | 0.147 | 91.5 |
| 93 | $j_3$-5 | 0.10 | 7.0 | 45.2 | 57.7 | 0.141 | 91.6 |

According to the methods of Test Nos. 89 to 93 (the methods of the present invention) wherein the flotation is effected in the presence of an amphoteric compound shown in Table III-10 at a specific pH, as compared with those of Test Nos. 87 and 88 (comparative methods), there can be expected to attain an improvement in whiteness of the reclaimed paper, a reduction of residual ink spots in the reclaimed paper and an increase in the recovery of pulp.

Example III-12

Deinking test was carried out according to the method described in Example III-1 by using amphoteric compounds shown in Tables III-11 and III-12, and Table III-24. The results are shown in Table III-24.

TABLE III-24

| | Amphoteric compound | | | Whiteness (%) | | Residual ink area ratio (%) | |
|---|---|---|---|---|---|---|---|
| Test No. | Compound No. | Amount added (%) | pH in flotation | Before flotation | After flotation | After flotation | Recovery of pulp (%) |
| 94 | None | — | 10.0 | 45.2 | 52.2 | 0.763 | 86.5 |
| 95 | None | — | 7.0 | 45.4 | 54.3 | 0.439 | 88.6 |
| 96 | $k_3$-1 | 0.30 | 7.0 | 45.3 | 57.9 | 0.136 | 91.8 |
| 97 | $k_3$-2 | 0.30 | 7.0 | 45.4 | 57.8 | 0.138 | 91.4 |
| 98 | $k_3$-3 | 0.30 | 7.0 | 45.3 | 57.9 | 0.136 | 91.4 |
| 99 | $l_3$-1 | 0.30 | 7.0 | 45.4 | 58.0 | 0.135 | 91.0 |
| 100 | $l_3$-2 | 0.30 | 7.0 | 45.5 | 57.5 | 0.142 | 92.2 |
| 101 | $l_3$-3 | 0.30 | 7.0 | 45.2 | 57.5 | 0.143 | 92.4 |

According to the methods of Test Nos. 96 to 101 (the methods of the present invention) wherein the flotation is effected in the presence of an amphoteric compound shown in Table III-11 or III-12 at a specific pH, as compared with those of Test Nos. 94 and 95 (comparative methods), there can be expected to attain an improvement in whiteness of the reclaimed paper, a reduction of residual ink spots in the reclaimed paper and an increase in the recovery of pulp.

Example III-13

Deinking test was carried out in a similar manner as that in Example I-7 except that the pH of the pulp slurries were each adjusted to a value shown in Table III-25 and that amphoteric compounds shown in Tables III-1, III-2 and III-3, and Table III-25 were used instead of the cationic compounds. The results thereof are shown in Table III-25.

TABLE III-25

| Test No. | Deinking agent No. (See Table I-12) | Amphoteric compound Compd. No. | Amount added (%) | pH in flotation | Whiteness (%) Before flotation | Whiteness (%) After flotation | Residual ink area ratio (%) After flotation | Recovery of pulp (%) |
|---|---|---|---|---|---|---|---|---|
| 102 | A1 | None | — | 10.0 | 43.9 | 51.0 | 0.841 | 88.5 |
| 103 | A2 | None | — | 10.0 | 44.0 | 52.2 | 0.785 | 86.5 |
| 104 | A3 | None | — | 10.0 | 44.6 | 52.1 | 0.771 | 86.2 |
| 105 | A4 | None | — | 10.0 | 47.8 | 53.5 | 0.415 | 90.0 |
| 106 | A1 | $a_3$-1 | 0.10 | 7.0 | 44.2 | 56.2 | 0.210 | 91.5 |
| 107 | A2 | $a_3$-2 | 0.10 | 7.0 | 44.3 | 57.3 | 0.158 | 90.4 |
| 108 | A3 | $b_3$-6 | 0.10 | 7.0 | 44.6 | 57.1 | 0.166 | 89.5 |
| 109 | A4 | $c_3$-1 | 0.05 | 7.0 | 47.0 | 58.1 | 0.161 | 93.4 |

According to the methods of Test Nos. 106 to 109 (the methods of the present invention) wherein various deinking agents are each used and the flotation is effected in the presence of an amphoteric compound at a specific pH, as compared with those of Test Nos. 102 to 105 (comparative methods), there can be expected to attain an improvement in whiteness of the reclaimed paper, a reduction of residual ink spots in the reclaimed paper and an increase in the recovery of pulp.

Example III-14

Deinking test was carried out in a similar manner as that in Example I-8 except that the $Ca^{2+}$ ion concentrations and the pH of the pulp slurries were each adjusted to a value shown in Table III-26 and that amphoteric compounds shown in Tables III-1, III-2 and III-3, and Table III-26 were used instead of the cationic compounds.

The results thereof are shown in Table III-26.

with those of Test Nos. 110 to 115 (comparative methods), there can be expected to attain an improvement in whiteness of the reclaimed paper, a reduction of residual ink spots in the reclaimed paper and an increase in the recovery of pulp, by the selective removal of ink in flotation.

Example III-15

Deinking test was carried out in a similar manner as that in Example I-9 except that the $Al^{3+}$ ion concentrations, the $Ca^{2+}$ ion concentrations and the pH of the pulp slurries were each adjusted to a value shown in Table III-27 and that amphoteric compounds shown in Tables III-1, III-2 and III-3, and Table III-27 were used instead of the cationic compounds. For the adjustment of the $Ca^{2+}$ ion concentration, $CaCi_2$ was used, and for the adjustment of $Al^{3+}$ ion concentration, white water resulting from paper-making, or the white water and aluminum sulfate (in Test Nos. 131, 135 and 139) was(were) used. Further, for the adjustment of pH, hydrochloric acid or sodium hydroxide was used.

TABLE III-26

| Test No. | Amphoteric compound Compound No. | Amount added (%) | pH in flotation | $Ca^{2+}$ ion concentration (ppm) | Whiteness (%) Before flotation | Whiteness (%) After flotation | Residual ink area ratio (%) After flotation | Recovery of pulp (%) |
|---|---|---|---|---|---|---|---|---|
| 110 | None | — | 10.0 | 0 | 44.8 | 52.1 | 0.770 | 86.4 |
| 111 | None | — | 10.0 | 50 | 45.0 | 52.2 | 0.752 | 86.8 |
| 112 | None | — | 10.0 | 100 | 45.3 | 52.5 | 0.743 | 87.3 |
| 113 | None | — | 10.0 | 200 | 45.2 | 52.6 | 0.739 | 87.3 |
| 114 | None | — | 10.0 | 400 | 45.0 | 52.3 | 0.765 | 87.6 |
| 115 | None | — | 10.0 | 800 | 44.7 | 51.8 | 0.781 | 87.6 |
| 116 | $a_3$-1 | 0.06 | 7.0 | 0 | 44.4 | 57.3 | 0.162 | 93.4 |
| 117 | $a_3$-1 | 0.06 | 7.0 | 50 | 44.9 | 57.7 | 0.157 | 93.0 |
| 118 | $a_3$-1 | 0.06 | 7.0 | 100 | 44.9 | 58.5 | 0.100 | 92.6 |
| 119 | $a_3$-1 | 0.06 | 7.0 | 200 | 45.2 | 59.2 | 0.095 | 93.0 |
| 120 | $a_3$-1 | 0.06 | 7.0 | 400 | 44.7 | 57.6 | 0.136 | 93.7 |
| 121 | $a_3$-1 | 0.06 | 7.0 | 800 | 44.6 | 56.8 | 0.230 | 94.1 |
| 122 | $b_3$-1 | 0.10 | 7.0 | 0 | 44.3 | 56.6 | 0.156 | 93.2 |
| 123 | $b_3$-1 | 0.10 | 7.0 | 200 | 45.3 | 58.6 | 0.099 | 92.8 |
| 124 | $b_3$-1 | 0.10 | 7.0 | 800 | 44.5 | 56.1 | 0.232 | 93.0 |
| 125 | $c_3$-2 | 0.03 | 7.0 | 0 | 44.4 | 56.8 | 0.158 | 91.7 |
| 126 | $c_3$-2 | 0.03 | 7.0 | 200 | 45.1 | 58.7 | 0.091 | 91.3 |
| 127 | $c_3$-2 | 0.03 | 7.0 | 800 | 44.7 | 56.3 | 0.241 | 92.4 |

Note) The $Ca^{2+}$ ion concentrations in the above Table were determined in flotation.

According to the methods of Test Nos. 116 to 127 (the methods of the present invention) wherein the flotation is effected in the presence of an amphoteric compound at a specific pH at a specific $Ca^{2+}$ ion concentration, as compared The results thereof are shown in Table III-27.

TABLE III-27

| | Amphoteric compound | | | | | Whiteness (%) | | Residual ink area ratio (%) | |
|---|---|---|---|---|---|---|---|---|---|
| Test No. | Compd. No. | Amount added (%) | pH in flotation | $Al^{3+}$ ion conc. (ppm) | $Ca^{2+}$ ion conc. (ppm) | Before flotation | After flotation | After flotation | Recovery of pulp (%) |
| 128 | None | — | 10.0 | 0 | 100 | 45.3 | 52.5 | 0.743 | 87.3 |
| 129 | None | — | 10.0 | 20 | 100 | 45.5 | 52.2 | 0.776 | 85.2 |
| 130 | None | — | 10.0 | 40 | 100 | 44.4 | 51.9 | 0.802 | 82.7 |
| 131 | None | — | 10.0 | 60 | 100 | 43.4 | 51.7 | 0.822 | 79.3 |
| 132 | $a_3$-1 | 0.06 | 7.0 | 0 | 100 | 44.9 | 58.5 | 0.100 | 92.7 |
| 133 | $a_3$-1 | 0.06 | 7.0 | 20 | 100 | 45.1 | 57.8 | 0.133 | 90.6 |
| 134 | $a_3$-1 | 0.06 | 7.0 | 40 | 100 | 44.4 | 56.6 | 0.239 | 88.3 |
| 135 | $a_3$-1 | 0.06 | 7.0 | 60 | 100 | 43.3 | 54.0 | 0.463 | 85.0 |
| 136 | $b_3$-1 | 0.06 | 7.0 | 20 | 100 | 45.2 | 57.2 | 0.137 | 90.3 |
| 137 | $b_3$-1 | 0.06 | 7.0 | 60 | 100 | 43.4 | 53.4 | 0.576 | 84.7 |
| 138 | $c_3$-2 | 0.06 | 7.0 | 20 | 100 | 45.0 | 57.3 | 0.129 | 88.8 |
| 139 | $c_3$-2 | 0.06 | 7.0 | 60 | 100 | 43.2 | 53.5 | 0.568 | 83.2 |

Note) The $Al^{3+}$ ion concentrations and the $Ca^{2+}$ ion concentrations in the above Table were determined in flotation.

According to the methods of Test Nos. 132 to 139 (the methods of the present invention) wherein the flotation is effected in the presence of an amphoteric compound at a specific pH at a specific $Ca^{2+}$ ion concentration, as compared with those of Test Nos. 128 to 131 (comparative methods), an improvement in whiteness of the reclaimed paper, a reduction of residual ink spots in the reclaimed paper and an increase in the recovery of pulp there can be attained. Further, when $Al^{3+}$ ion concentration of the slurry in flotation is 40 ppm or less, it can be expected to obtain qualities superior thereto.

Example III-16

Waste papers (news papers/leaflets=75/25) recovered in a city were treated according to the following deinking methods, and the performances of the pulp sheet thus obtained were evaluated in the same manner as that in Example I-1. The results thereof are shown in Table III-28.

In this Example, the $Ca^{2+}$ ion concentration of the warm water had been adjusted with $CaCl_2$, while the $Al^{3+}$ ion concentration thereof had been adjusted with white water resulting from paper-making.

(1) Test Nos. 140 and 141

The pulp sheet were prepared in a similar manner as that in Example I-10-(1) except that the $Al^{3+}$ ion concentrations, the $Ca^{2+}$ ion concentrations and the pH of the pulp slurries were each adjusted to a value shown in Table III-28.

(2) Test Nos. 142 and 143

The pulp sheet were prepared in a similar manner as that in Example I-10-(2) except that the $Al^{3+}$ ion concentrations, the $Ca^{2+}$ ion concentrations and the pH of the pulp slurries were each adjusted to a value shown in Table III-28. In Test No. 142, aluminum sulfate was also added to the pulp slurry to adjust the $Al^{3+}$ concentration of the slurry to a value shown in Table III-28.

(3) Test Nos. 144 to 146

The pulp sheet were prepared in a similar manner as that in Example I-10-(3) except that the $Al^{3+}$ ion concentrations, the $Ca^{2+}$ ion concentrations and the pH of the pulp slurries were each adjusted to a value shown in Table III-28 and that amphoteric compounds shown in Tables III-1, III-2 and III-3, and Table III-28 were used instead of the cationic compounds.

TABLE III-28

| | Nonionic compound or amphoteric compound | | | | | Whiteness (%) | | Residual ink area ratio (%) | |
|---|---|---|---|---|---|---|---|---|---|
| Test No. | Name or number of compound | | pH in flotation | $Al^{3+}$ ion conc. (ppm) | $Ca^{2+}$ ion conc. (ppm) | Before flotation | After flotation | After flotation | Recovery of pulp (%) |
| 140 | None | | 4.5 | 30 | 5 | 42.2 | 52.9 | 0.683 | 87.8 |
| 141 | None | | 7.0 | 15 | 200 | 42.1 | 52.8 | 0.690 | 87.1 |
| 142 | NP-800 | | 4.5 | 60 | 5 | 44.4 | 53.6 | 0.409 | 77.6 |
| 143 | NP-800 | | 7.0 | 15 | 200 | 44.6 | 53.4 | 0.418 | 78.2 |
| 144 | $a_3$-1 | | 7.0 | 15 | 200 | 45.3 | 58.3 | 0.113 | 90.3 |
| 145 | $b_3$-5 | | 7.0 | 15 | 200 | 45.4 | 58.2 | 0.118 | 90.1 |
| 146 | $c_3$-5 | | 7.0 | 15 | 200 | 45.3 | 57.9 | 0.120 | 89.7 |

Note) The $Al^{3+}$ ion concentrations and the $Ca^{2+}$ ion concentrations in the above Table were determined in flotation.

It is observed in Test Nos. 140 and 141 (comparative examples) that a lot of non-liberated ink spots which have not been removed from pulp by flotation is present in the reclaimed paper since the deinking agent having a poor power for liberating ink is used in the disintegrating step of waste papers. Accordingly, the reclaimed pulp is poor in quality. In Test Nos. 142 and 143 (comparative examples), the addition of the polyacrylamide optionally with aluminum sulfate causes the re-adhesion of ink to cellulose fibers, and reduces the quality of the reclaimed pulp. Further, it is observed that foaming in flotation is extremely enhanced to deteriorate the recovery of pulp.

In contrast, according to the methods of Test Nos. 144 to 146 (the methods of the present invention) wherein the flotation is effected in the presence of an amphoteric compound at a specific pH at a specific $Ca^{2+}$ ion concentration and at a specific $Al^{3+}$ ion concentration, an improvement in whiteness of the reclaimed paper, a reduction of residual ink spots in the reclaimed paper and an increase in the recovery of pulp are observed.

Example III-17

Deinking test was carried out according to the method described in Example III-1 by using amphoteric compound $m_3$-1 represented by the following formula:

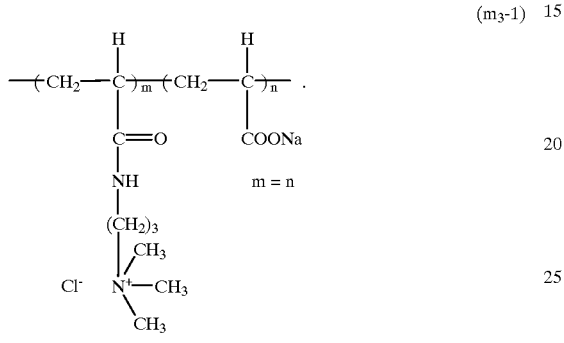

($m_3$-1)

The results are shown in Table III-14.

non-ionic surfactant under alkaline conditions, wherein said non-ionic surfactant is a reaction product obtained by adding an alkylene oxide to a mixture of oil and fat and an alcohol;

(2) a second step wherein the ink liberated in the first step is removed in a flotation system and prevented from re-adhering to the waste paper as raw material, said second step comprising at least one step, which is carried out in the presence of at least one member selected from the group consisting of amines and acid salts of amines in an amount of from 0.01 to 1.0% by weight based on the weight of the wastepaper, wherein the pH is lower in comparison to the pH of the first step and is in the range of 4 to 9; and wherein the amines and acid salts of amines are selected from the group consisting of compounds represented by the formulas ($a_2$) to ($h_2$) and polymers represented by the formulas ($i_2$) to ($l_2$), each of which has an amino-nitrogen content of 0.01 to 35% by weight and a weight-average molecular weight of 2,000 to 3,000,000:

TABLE III-29

| | | Amphoteric polymer | | | | Residual ink | | | |
| | | Content of | weight-average | | | Whiteness (%) | | area ratio (%) | |
| Test No. | Compd. No. | cationic nitrogen* (%) | molecular weight | Amount added (%) | pH in flotation | Before flotation | After flotation | After flotation | Recovery of pulp (%) |
| --- | --- | --- | --- | --- | --- | --- | --- | --- | --- |
| 147 | None | — | — | — | 10.0 | 45.0 | 52.2 | 0.752 | 86.8 |
| 148 | None | — | — | — | 9.0 | 45.4 | 52.8 | 0.683 | 87.2 |
| 149 | None | — | — | — | 8.0 | 44.9 | 53.3 | 0.411 | 88.3 |
| 150 | None | — | — | — | 7.0 | 45.6 | 53.6 | 0.365 | 88.9 |
| 151 | None | — | — | — | 6.0 | 45.0 | 54.0 | 0.329 | 88.9 |
| 152 | None | — | — | — | 5.0 | 44.6 | 53.1 | 0.431 | 89.1 |
| 153 | None | — | — | — | 4.0 | 44.3 | 52.9 | 0.625 | 87.6 |
| 154 | $m_3$-1 | 4.65 | 15,000 | 0.01 | 9.0 | 44.8 | 55.7 | 0.264 | 87.1 |
| 155 | $m_3$-1 | 4.65 | 15,000 | 0.01 | 8.0 | 45.0 | 57.7 | 0.145 | 89.3 |
| 156 | $m_3$-1 | 4.65 | 15,000 | 0.01 | 7.0 | 45.2 | 58.1 | 0.138 | 90.2 |
| 157 | $m_3$-1 | 4.65 | 15,000 | 0.01 | 6.0 | 44.8 | 57.8 | 0.148 | 89.5 |
| 158 | $m_3$-1 | 4.65 | 15,000 | 0.01 | 5.0 | 44.7 | 57.3 | 0.167 | 89.4 |
| 159 | $m_3$-1 | 4.65 | 15,000 | 0.01 | 4.0 | 44.8 | 56.7 | 0.231 | 88.3 |

Note) *The content (%) of cationic nitrogen was calculated by multiplying the nitrogen content (%) determined by Kjeldahl method by the ratio of the cationic nitrogen to the total nitrogen which was determined from the molecular formula of the polymer.

In the tests described above, Test No. 147 is effected in a similar manner as that of a conventional industrial deinking method. According to the methods of Test Nos. 154 to 159 (the methods of the present invention) wherein the flotation is effected in the presence of an amphoteric compound at a specific pH, as compared with those of Test Nos. 147 to 153 (comparative methods), there can be expected to attain an improvement in whiteness of the reclaimed paper, a reduction of residual ink spots in the reclaimed paper and an increase in the recovery of pulp, by the selective removal of ink in flotation.

What is claimed is:

1. A deinking method comprising the following steps:
   (1) a first step wherein ink is liberated from waste paper as a raw material in the presence of at least one -continued

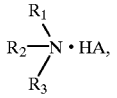

($b_2$)

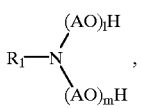

($c_2$)

-continued $R_1$—CONHCH$_2$CH$_2$NH$_2$ • HA, (d$_2$)

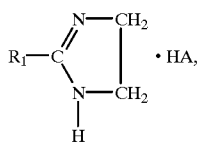
• HA, (e$_2$)

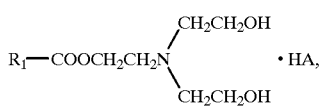
• HA, (f$_2$)

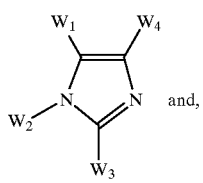
and, (g$_2$)

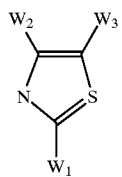
(h$_2$)

in formulas (a$_2$) to (h$_2$), R$_1$ represents an alkyl, alkenyl or β-hydroxyalkyl group having 8 to 36 carbon atoms; R$_2$ and R$_3$ may be the same or different from each other and each represents a hydrogen atom, an alkyl group having 1 to 24 carbon atoms or an alkenyl group having 2 to 24 carbon atoms; HA represents an inorganic or organic acid; AO represents an oxyalkylene group having 2 to 4 carbon atoms; l and m are each zero or a positive integer with the proviso that l plus m is an integer of 1 to 300; and W$_1$, W$_2$, W$_3$ and W$_4$ may be the same or different from one another and each represents a hydrogen atom or an alkyl group having 1 to 24 carbon atoms;

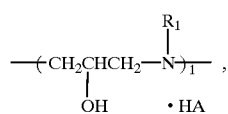
(i$_2$)

-continued

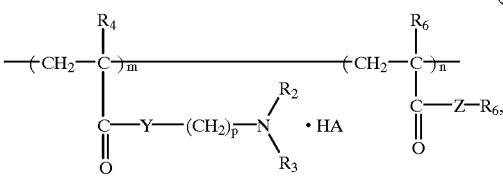
(j$_2$)

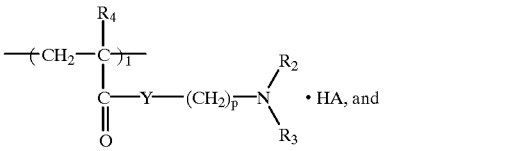
(k$_2$)

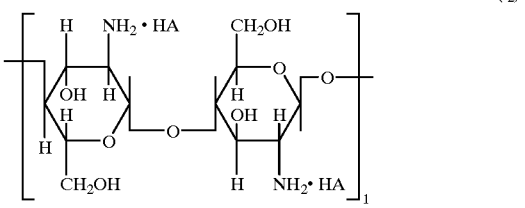
(l$_2$)

in formulas (i$_2$) to (l$_2$), R$_1$ represents an alkyl group having 1 to 24 carbon atoms or an alkenyl group having 2 to 24 carbon atoms; R$_2$, R$_3$ and R$_6$ may be the same or different from one another and each represents a hydrogen atom, an alkyl group having 1 to 24 carbon atoms or an alkenyl group having 2 to 24 carbon atoms; R$_4$ and R$_5$ may be the same or different from each other and each represents a hydrogen atom or a methyl group; HA represents an inorganic or organic acid; Y represents O or NH; p represents an integer of 1 to 10; and l, m and n are each such a positive number that the weight-average molecular weight of the polymer would be a value in the range of from 2,000 to 3,000,000.

2. The deinking method according to claim 1, which comprises maintaining the calcium ion concentration of the flotation system at a concentration of from 10 to 400 ppm.

3. The deinking method according to claim 2, wherein said calcium ion concentration of the flotation system is from 100 to 250 ppm.

4. The deinking method according to claim 1, which comprises maintaining the aluminum ion concentration of the flotation system at a concentration of from 0 to 40 ppm.

5. The deinking method of claim 1, wherein the pH in the second step is in the range of 6 to 8.

* * * * *